United States Patent
Maruyama et al.

(10) Patent No.: US 11,948,462 B2
(45) Date of Patent: *Apr. 2, 2024

(54) IMAGE GENERATING APPARATUS, IMAGE GENERATING METHOD, AND RECORDING MEDIUM

(71) Applicant: Panasonic Intellectual Property Management Co., Ltd., Osaka (JP)

(72) Inventors: Ayako Maruyama, Osaka (JP); Kunio Nobori, Osaka (JP); Takeo Azuma, Kyoto (JP); Satoshi Sato, Kyoto (JP); Nobuhiko Wakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,462

(22) Filed: Feb. 16, 2023

(65) Prior Publication Data

US 2023/0196921 A1    Jun. 22, 2023

Related U.S. Application Data

(63) Continuation of application No. 17/462,310, filed on Aug. 31, 2021, now Pat. No. 11,615,709, which is a (Continued)

(30) Foreign Application Priority Data

Jun. 7, 2016    (JP) ................................ 2016-113886

(51) Int. Cl.
*G06T 7/00*    (2017.01)
*B60R 1/00*    (2022.01)
(Continued)

(52) U.S. Cl.
CPC ............. *G08G 1/166* (2013.01); *B60R 1/003* (2013.01); *G01S 13/931* (2013.01); *G06T 5/005* (2013.01);
(Continued)

(58) Field of Classification Search
CPC ........ G08G 1/166; G08G 1/165; B60R 1/003; B60R 2300/105; B60R 2300/303;
(Continued)

(56) References Cited

U.S. PATENT DOCUMENTS 5,970,162 A * 10/1999 Kawashima ........... H04N 7/142
                                                  348/14.05
6,184,781 B1 * 2/2001 Ramakesavan .......... B60Q 1/52
                                                  348/148
(Continued)

FOREIGN PATENT DOCUMENTS

| | | |
|---|---|---|
| CN | 104717481 | 6/2015 |
| JP | 2010-288060 | 12/2010 |
| WO | 2000/007373 | 2/2000 |

OTHER PUBLICATIONS

Partial European Search Report dated Nov. 9, 2017 in corresponding European Patent Application No. 17 172169.9.
(Continued)

*Primary Examiner* — Frank F Huang
(74) *Attorney, Agent, or Firm* — WENDEROTH, LIND & PONACK, L.L.P.

(57) ABSTRACT

An image generating apparatus generates an image to be displayed on a display and includes at least one memory and a control circuit. The control circuit acquires a plurality of camera images captured by a plurality of cameras installed in a vehicle, calculates a distance between one of the cameras and a target to be projected in in the camera images, detects a position of a light-transmissive object or a reflec-
(Continued)

tive object in the camera images, and generates an image from a point of view that is different from points of view of the plurality of camera images by using the plurality of camera images and the distance, the generated image including a predetermined image that is displayed at the position of the light-transmissive object or the reflective object.

7 Claims, 25 Drawing Sheets

Related U.S. Application Data continuation of application No. 16/795,740, filed on Feb. 20, 2020, now Pat. No. 11,183,067, which is a continuation of application No. 15/608,021, filed on May 30, 2017, now Pat. No. 11,056,001.

(51) Int. Cl.
| | |
|---|---|
| *G01S 13/931* | (2020.01) |
| *G06T 5/00* | (2006.01) |
| *G06T 7/70* | (2017.01) |
| *G06T 11/00* | (2006.01) |
| *G08G 1/16* | (2006.01) |
| *H04N 7/18* | (2006.01) |

(52) U.S. Cl.
CPC ............... *G06T 7/70* (2017.01); *G06T 11/00* (2013.01); *G08G 1/165* (2013.01); *H04N 7/181* (2013.01); *B60R 2300/105* (2013.01); *B60R 2300/303* (2013.01); *G06T 2207/30252* (2013.01)

(58) Field of Classification Search
CPC ............... B60R 1/00; B60R 2300/205; B60R 2300/304; B60R 2300/607; B60R 2300/80; B60R 2300/8053; G01S 13/931; G06T 5/005; G06T 7/70; G06T 11/00; G06T 2207/30252; G06T 2207/10012; H04N 7/181; H04N 23/60
See application file for complete search history.

(56) References Cited

U.S. PATENT DOCUMENTS

| | | | | |
|---|---|---|---|---|
| 7,103,545 B2* | 9/2006 | Furuta | ....................... | E02F 9/26 704/275 |
| 7,307,655 B1 | 12/2007 | Okamoto et al. | | |
| 7,466,337 B2* | 12/2008 | Sawada | .................. | E02F 9/0858 348/148 |
| 7,640,107 B2* | 12/2009 | Shimizu | .................... | B60R 1/00 382/104 |
| 9,332,229 B2* | 5/2016 | Ishimoto | ................. | G06V 20/58 |
| 9,519,832 B2* | 12/2016 | Lee | ............................ | B60R 1/00 |
| 2003/0122930 A1* | 7/2003 | Schofield | .................. | B60R 1/00 348/E7.086 |
| 2003/0222793 A1* | 12/2003 | Tanaka | ....................... | B60R 1/00 348/148 |
| 2010/0118146 A1* | 5/2010 | Schofield | .................. | B60R 1/00 348/148 |
| 2010/0245577 A1* | 9/2010 | Yamamoto | ................ | B60R 1/00 348/148 |
| 2011/0285848 A1* | 11/2011 | Han | ........................... | B60R 1/00 348/148 |
| 2012/0069153 A1* | 3/2012 | Mochizuki | ................ | B60R 1/00 348/148 |
| 2013/0250070 A1 | 9/2013 | Takayama | | |
| 2015/0172633 A1 | 6/2015 | Nobori et al. | | |
| 2020/0097617 A1* | 3/2020 | Zhilinsky | ................ | G06T 11/00 |

OTHER PUBLICATIONS

"Neue Generation Surround View im 7er-BMW (G11/G12)", youtube, Aug. 30, 2015 (Aug. 30, 2015), p. 1 pp., XP054977824, Retrieved from the Internet: URL:https://www.youtube.com/watch?v=MckpXCmT7Dk [retrieved on Oct. 24, 2017).
"BMW 7 series surround camera", youtube, Mar. 8, 2016 (Mar. 8, 2016), p. 1 pp., XP054977823, Retrieved from the Internet: URL:https://www.youtube.com/watch?v=PQnxNC8fsKc [retrieved on Oct. 24, 2017).
Klan K et al., "Transparent Object Detection and Reconstruction on a Mobile Platform", 2011 IEEE International Conference on Robotics and Automation, Shanghai International Conference Center, May 9-13, 2011, Shanghai, China.
The Extended European Search Report dated Feb. 18, 2020 for the related European Patent Application No. 17 172 169.9.
Alt Nicolas et al., "Reconstruction of Transparent Objects in Unstructured Scenes With a Depth Camera", 2013 IEEE International Conference on Image Processing, IEEE, Sep. 15, 2013 (Sep. 15, 2013), pp. 4131-4135, XP032966451 [retrieved on Feb. 11, 2014].
English Translation of Chinese Search Report dated Aug. 25, 2021 for Chinese Patent Application No. 201710321538.6.

* cited by examiner

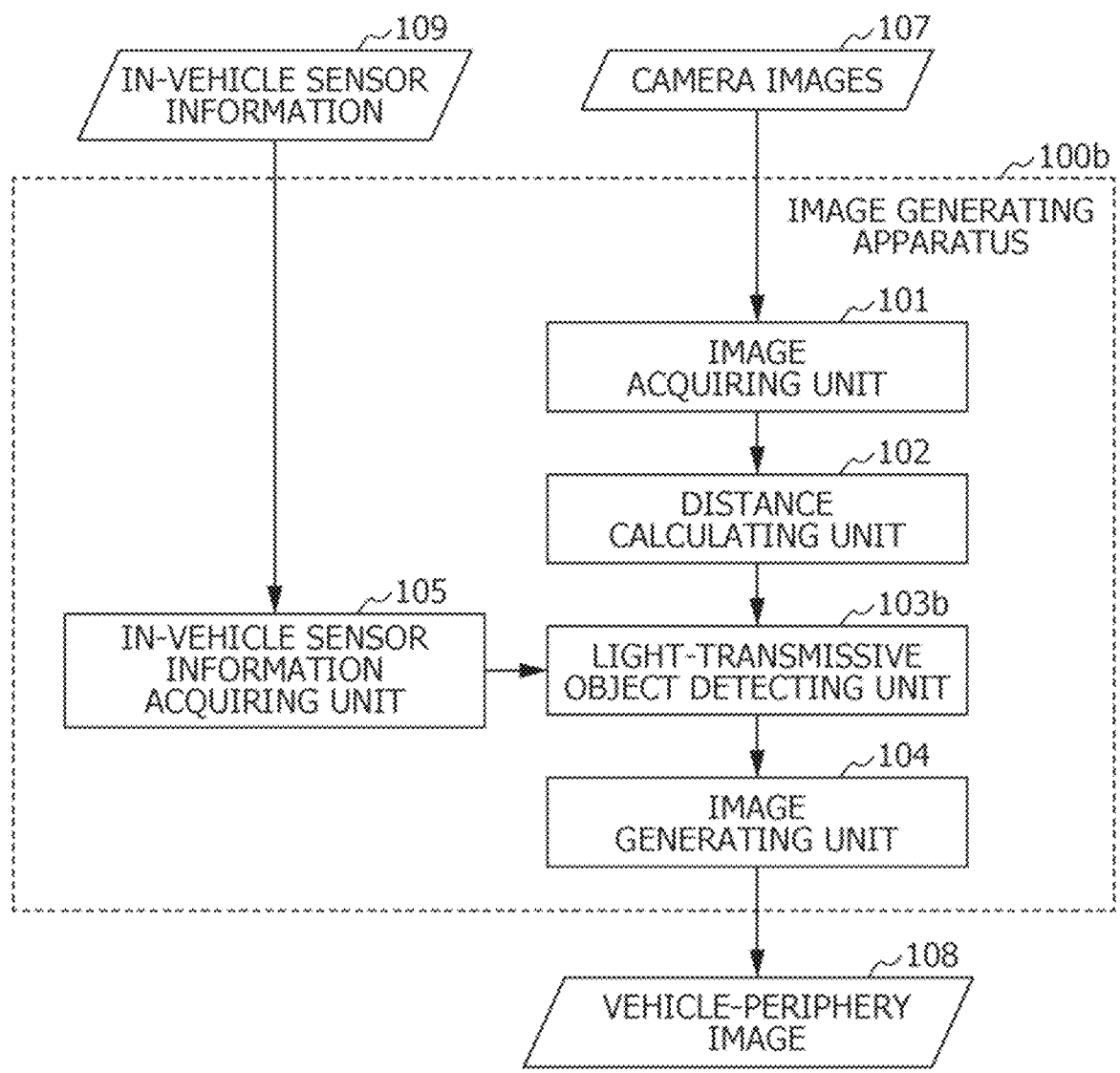

IMAGE GENERATING APPARATUS, IMAGE GENERATING METHOD, AND RECORDING MEDIUM

BACKGROUND

1. Technical Field

The present disclosure relates to an image generating apparatus and an image generating method, and particularly to image generation when presenting a vehicle-periphery image obtained from images captured by image-capturing apparatuses installed in a vehicle.

2. Description of the Related Art

A large number of techniques for presenting a vehicle-periphery image obtained from images captured by image-capturing apparatuses installed in a vehicle have been proposed in order to assist safe driving.

For example, an image generating apparatus disclosed in Japanese Patent No. 3286306 maps captured images in a predetermined space model. Japanese Patent No. 3286306 discloses a method in which, by using a bowl-shaped model as the space model in the above case, images of objects that are present in the periphery of a vehicle are combined so as to be as similar to real objects as possible all around the vehicle and are displayed to a driver. This method is advantageous in enabling the driver to easily recognize the situation in the periphery of the subject vehicle because an image from a point of view as if looking down on the subject vehicle from above can be generated.

In addition, Japanese Patent No. 5299101 proposes a method for calculating three-dimensional image data on the basis of image data obtained by a stereo camera that captures images of the periphery of a vehicle. As disclosed in the above document, the following method is well known. If two or more cameras are disposed so as to capture images in overlapping fields of view from different points of view, and information such as the positions and orientations of the cameras is obtained in advance, by so-called trigonometry from the correspondence relationship between points in the captured images, it is possible to calculate the three-dimensional position of an object that is present in the overlapping fields of view. Japanese Patent No. 5299101 discloses a method in which, by restricting a region that is the target of three-dimensional measurement, information of the periphery of a vehicle is mapped on a three-dimensional map that is more similar to the actual environment and in which an image with a transformed point of view is generated while suppressing the calculation cost to some extent.

However, with the above techniques of the related art, it is difficult to display a light-transmissive object such as a glass surface or a reflective object in a vehicle-periphery image so as to be easily recognizable by a driver.

SUMMARY

One non-limiting and exemplary embodiment provides an image generating apparatus that is suitable for generating an image including a light-transmissive object and a reflective object.

In one general aspect, the techniques disclosed here feature an image generating apparatus that generates an image to be displayed on a display, the image generating apparatus including at least one memory and a control circuit, in which the control circuit (a) acquires a plurality of camera images captured by a plurality of cameras installed in a vehicle, (b) calculates a distance between one of the cameras and a target included in the camera images in a three-dimensional space by using the plurality of camera images, (c) detects a position of a light-transmissive object or a reflective object in the camera images, and (d) generates an image from a point of view that is different from points of view of the plurality of camera images by using at least one of the plurality of camera images and the distance, the generated image including a predetermined image that is displayed at the position of the light-transmissive object or the reflective object.

It should be noted that general or specific embodiments may be implemented as an apparatus, a method, a system, an integrated circuit, a computer program, a computer-readable recording medium, or any selective combination thereof. Examples of the computer-readable recording medium include a non-volatile recording medium such as a compact disc-read only memory (CD-ROM).

According to the present disclosure, since the position of the light-transmissive object or the reflective object in the camera images is detected, an image that is easily recognized by a driver can be displayed at the position of the light-transmissive object or the reflective object in the generated image in a manner different from that of other objects. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a block diagram illustrating an example of a functional configuration of an image generating apparatus according to the fifth embodiment;

DETAILED DESCRIPTION

Figure 1:
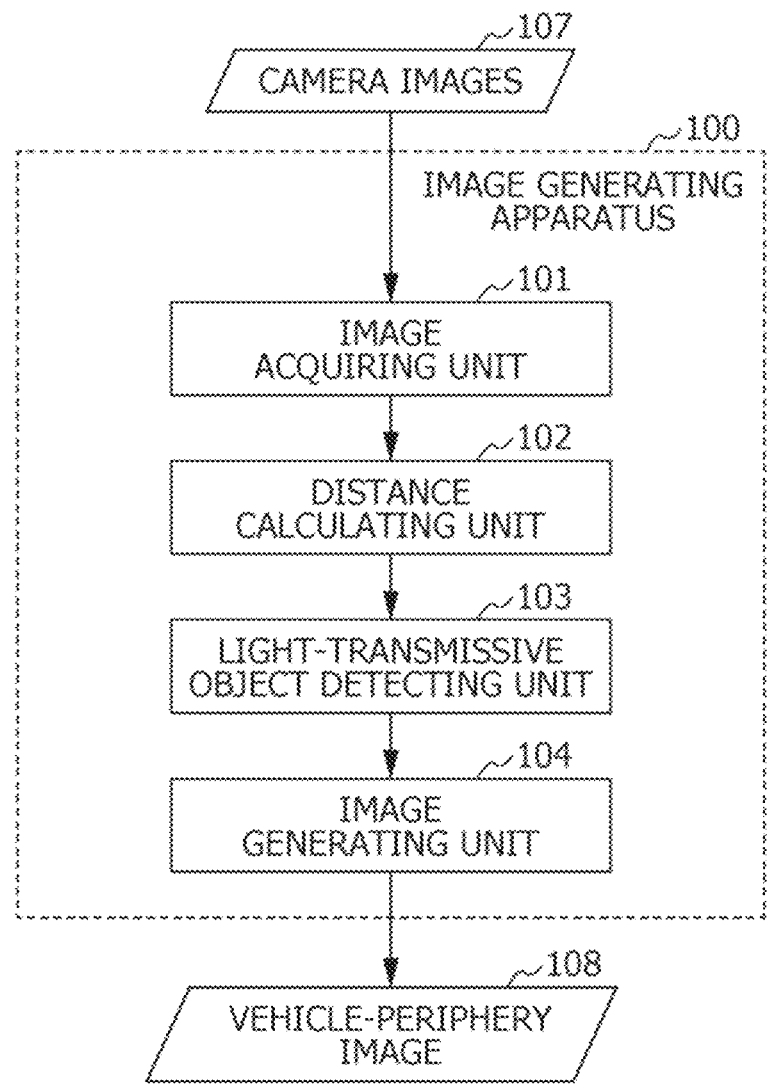
FIG. 1 is a block diagram illustrating an example of a functional configuration of an image generating apparatus according to a first embodiment.

Underlying Knowledge Forming Basis of the Present Disclosure

As described above, in the techniques of the related art, it is not considered to display a light-transmissive object such as a glass surface or a reflective object in a vehicle-periphery image so as to be easily recognizable by a driver.

In Japanese Patent No. 3286306, since accurate positions of objects are not considered after all, an image of a light-transmissive object or a reflective object may be mapped in a generated image at a position different from the actual position thereof. Accordingly, in the generated image, an object may be displayed at a position different from the actual position thereof.

A periphery display apparatus according to Japanese Patent No. 5299101 measures the three-dimensional position of an object by using image data obtained by a stereo camera. Accordingly, since a view looking down from above is displayed by measuring the actual position of an object, it is considered that the position of the object is considered to be displayed more accurately.

However, the inventors have focused on a new problem that arises if the position of an object is measured by using image data obtained by a stereo camera. The new problem is that it is difficult to measure the position of a reflective object or a light-transmissive object by using image data obtained by a stereo camera without considering the reflective object or the light-transmissive object.

Since the light-transmissive object or the reflective object has no texture, it is difficult to identify the position of the light-transmissive object or the reflective object by a typical method using image data obtained by a stereo camera. In addition, the position of an object located behind the light-transmissive object or an object reflected on the reflective object may be estimated as a wrong position of the light-transmissive object or the reflective object. As a result, an image is generated in which an object is located more distant from the light-transmissive object or the reflective object.

Thus, it is not desirable in assisting safe driving to generate an image in which an object is not displayed at an accurate position of the light-transmissive object or the reflective object and to provide such an image to a user.

Accordingly, an image generating apparatus according to an embodiment of the present disclosure is an image generating apparatus that generates an image to be displayed on a display, the image generating apparatus including at least one memory and a control circuit, in which the control circuit (a) acquires a plurality of camera images captured by a plurality of cameras installed in a vehicle, (b) calculates a distance between one of the cameras and a target included in the camera images in a three-dimensional space by using the plurality of camera images, (c) detects a position of a light-transmissive object or a reflective object in the camera images, and (d) generates an image from a point of view that is different from points of view of the plurality of camera images by using at least one of the plurality of camera images and the distance, the generated image including a predetermined image that is displayed at the position of the light-transmissive object or the reflective object.

With such a configuration, the position of the light-transmissive object or the reflective object in the camera images is detected, and accordingly, an image that is easily recognized by a driver can be displayed at the position of the light-transmissive object or the reflective object in the generated image in a manner different from that of other objects.

The control circuit may further (e) estimate a distance between the camera and the light-transmissive object or the reflective object and (f) correct the distance between the camera and the target at the position of the light-transmissive object or the reflective object in the camera images to the estimated distance, and in the (d), the image may be generated by using the plurality of camera images and the corrected distance.

With such a configuration, by estimating the distance to the light-transmissive object or the reflective object by a method different from the stereo distance measurement, it is possible to obtain, as the generated image, a camera image that has been rendered by using the estimated distance. Accordingly, it is possible to display the light-transmissive object or the reflective object at an estimated position of the light-transmissive object or the reflective object instead of the position based on the stereo distance measurement. Therefore, the generated image is useful in notifying the driver of the presence of the light-transmissive object or the reflective object.

In the (a), a polarized camera image captured by a polarization camera that captures an image through a polarization plate may be acquired, and in the (c), a position where brightness of the polarized camera image periodically changes may be detected as the position of the light-transmissive object or the reflective object.

With such a configuration, by using light polarization characteristics, it is possible to detect the position of the light-transmissive object or the reflective object.

The control circuit may further (g) acquire a plurality of infrared camera images captured by a plurality of far-infrared cameras and (h) calculate a distance between one of the far-infrared cameras and the target included in the infrared camera images in a three-dimensional space by using the plurality of infrared camera images, and in the (c), a position where a difference between the distance calculated by using the camera images and the distance calculated by using the infrared camera images is larger than a predetermined threshold may be detected as the position of the light-transmissive object or the reflective object.

With such a configuration, by using the difference between visible-light absorption characteristics and far-infrared-light absorption characteristics of glass, it is possible to detect the position of the light-transmissive object or the reflective object.

In the (c), a frame-shaped object included in the camera images may be recognized, and a region inside the recognized frame-shaped object may be detected as the position of the light-transmissive object or the reflective object.

With such a configuration, it is possible to detect the position of the light-transmissive object or the reflective object from the frame-shaped object typically provided in the periphery of the light-transmissive object or the reflective object such as a window frame provided for a glass window.

In the (d), a part of one of the plurality of camera images may be displayed at the position of the light-transmissive object or the reflective object in the generated image.

With such a configuration, the appearance of an object that is reflected on the light-transmissive object or the reflective object is displayed at the position of the light-transmissive object or the reflective object, and accordingly, the generated image with high visibility can be obtained.

In the (d), a camera image including a larger area of the light-transmissive object or the reflective object may be preferentially displayed among the plurality of camera images at the position of the light-transmissive object or the reflective object in the generated image.

With such a configuration, brightness mismatch between adjacent pixels in the generated image can be suppressed, and accordingly, it is possible to obtain the generated image that is easy to view.

In the (d), a camera image including a larger area of the light-transmissive object or the reflective object may be preferentially displayed among the plurality of camera images at positions of a plurality of light-transmissive objects or reflective objects in the generated image.

With such a configuration, brightness mismatch between adjacent pixels in the generated image can be suppressed for each light-transmissive object or each reflective object, and accordingly, it is possible to obtain the generated image that is easy to view.

The control circuit may further (i) separate a light-transmissive component and a reflective component from each other, the light-transmissive component and the reflective component being included at the position of the light-transmissive object in the camera images, and in the (d), the light-transmissive component and the reflective component may be displayed by being assigned weights at a predetermined ratio at the position of the light-transmissive object in the generated image.

With such a configuration, the image can be generated by, after separating the reflective component and the light-transmissive component from each other, assigning weights at the predetermined ratio, and accordingly, it is possible to suppress the occurrence of a malfunction that both the reflective component and the light-transmissive component are present in the generated image, which is untidy and difficult to view.

In the (i), a polarized camera image captured by a polarization camera that captures an image through a polarization plate may be acquired, and the light-transmissive component and the reflective component may be separated from each other by using the polarized camera image.

With such a configuration, by using light polarization characteristics, it is possible to separate the reflective component and the light-transmissive component from each other.

In the (d), the predetermined ratio may be received from a user, and the light-transmissive component and the reflective component may be displayed by being assigned weights at the predetermined ratio received from the user at the position of the light-transmissive object in the generated image.

With such a configuration, it is possible to display the image by assigning weights to the reflective component and the light-transmissive component at a desired ratio at which the user considers the image is easy to view.

In the (d), the light-transmissive component and the reflective component may be displayed at the position of the light-transmissive object in the generated image by being assigned weights in such a manner that the weight of the reflective component is lower than the weight of the light-transmissive component when external light is brighter.

For example, during the daytime on a sunny day, since the falling sunlight is intense, specular reflection on a glass surface may cause glare to the driver. Since the reflective component is likely to be dominant, in this period of time or if the weather is like this, the ratio of the reflective component may be decreased compared with other periods of time or other weather. In addition, during evening to nighttime, the brightness inside a space separated by a glass surface may largely differ from the brightness outside the space. If the inside space is bright, the light-transmissive component is dominant, and accordingly, the ratio of the light-transmissive component may be decreased compared with other periods of time.

In the (d), if a predetermined condition that the camera images exhibit an appropriate exposure state is not satisfied, such a message may be displayed in the generated image that prompts a driver to see a periphery of the vehicle.

With such a configuration, if it is considered that it is not possible to detect the position of the reflective component or the light-transmissive component with sufficiently high accuracy from the camera images, specifically, if pixels more than or equal to a predetermined ratio are saturated in the camera images due to reflected light of the lamps of the subject vehicle and/or another vehicle, and/or if a histogram of the camera image includes a strong bias in a bright part and a dark part, the drivers attention can be attracted.

The plurality of cameras may include a first camera that captures an image of a forward area of the vehicle and a second camera that captures an image of a backward area of the vehicle, and the control circuit may further (j) acquire a heading direction of the vehicle, and in the (c), the position of the light-transmissive object or the reflective object may be detected by using a camera image obtained by a camera that captures an image in a direction that is same as the heading direction of the vehicle, the camera being selected from the first camera and the second camera.

With such a configuration, it is possible to obtain a generated image that is useful in assisting safe driving at a reduced calculation cost.

In the (c), if the estimated distance between the camera and the light-transmissive object or the reflective object is larger than a predetermined threshold, the distance between the camera and the target at the position of the light-transmissive object or the reflective object may not be corrected.

With such a configuration, it is possible to obtain a generated image that is useful in assisting safe driving at a reduced calculation cost.

In the (c), if a detected lowest end of the light-transmissive object or the reflective object is higher than or equal to a predetermined threshold from a surface of a road, the distance between the camera and the light-transmissive object or the reflective object may not be estimated, and the distance between the camera and a point in a space to be projected at the position of the light-transmissive object or the reflective object may not be corrected.

With such a configuration, it is possible to obtain a generated image that is useful in assisting safe driving at a reduced calculation cost.

In the (c), if a detected size of the light-transmissive object or the reflective object is smaller than a predetermined threshold, the distance between the camera and the light-transmissive object or the reflective object may not be estimated, and the distance between the camera and a point in a space to be projected at the position of the light-transmissive object or the reflective object may not be corrected.

With such a configuration, it is possible to obtain a generated image that is useful in assisting safe driving at a reduced calculation cost.

Note that the image generating apparatus according to an embodiment of the present disclosure is not only implemented by a hardware configuration of corresponding functional units but also can be implemented as an image generating method including steps of the corresponding functional units. Alternatively, the image generating method can be implemented by a program on a computer. Further alternatively, the image generating method can be implemented by a computer-readable recording medium such as a digital versatile disk read only memory (DVD-ROM) recording the program thereon or an image processing apparatus that generates an image from a given point of view from captured images, for example.

First Embodiment

Now, an image generating apparatus according to a first embodiment will be described below by taking an example of an image generating apparatus that is installed in a vehicle and that generates a vehicle-periphery image to be presented to an occupant (in particular, a driver).

FIG. 1 is a block diagram illustrating an example of a functional configuration of the image generating apparatus according to the first embodiment. As illustrated in FIG. 1, an image generating apparatus 100 includes an image acquiring unit 101, a distance calculating unit 102, a light-transmissive object detecting unit 103, and an image generating unit 104.

The image acquiring unit 101 acquires a plurality of camera images 107 that are moving images captured by a plurality of cameras. Examples of the camera images 107 include images of the periphery of the vehicle.

The distance calculating unit 102 calculates the distance between a camera and an object included in the camera images 107 by using the plurality of camera images 107.

The light-transmissive object detecting unit 103 detects the position of a light-transmissive object or a reflective object in the camera images 107.

Here, the light-transmissive object is an object in an image of which, captured by a visible-light camera, transmitted light is dominant. Examples of the light-transmissive object include transparent glass, plastic, and the like.

In addition, the reflective object is an object in an image of which, captured by a visible-light camera, specular-reflected light is dominant. Examples of the reflective object include a mirror, shimmering metal, and the like.

The image generating unit 104 generates a vehicle-periphery image 108, which is a generated image from a point of view different from the points of view of the camera images 107, by using the plurality of camera images 107 and the distance calculated by the distance calculating unit 102. A predetermined image is displayed at the position of the light-transmissive object or the reflective object in the vehicle-periphery image 108.

Here, the image acquiring unit 101 may be, for example, a camera or a communication interface connected to a camera, or may be an interface that reads the camera images 107 stored in a storing apparatus that is separately provided.

The distance calculating unit 102, the light-transmissive object detecting unit 103, and the image generating unit 104 may be, for example, implemented by software such as programs executed on a computer or may be implemented by hardware such as an electronic circuit or an integrated circuit.

Figure 2:
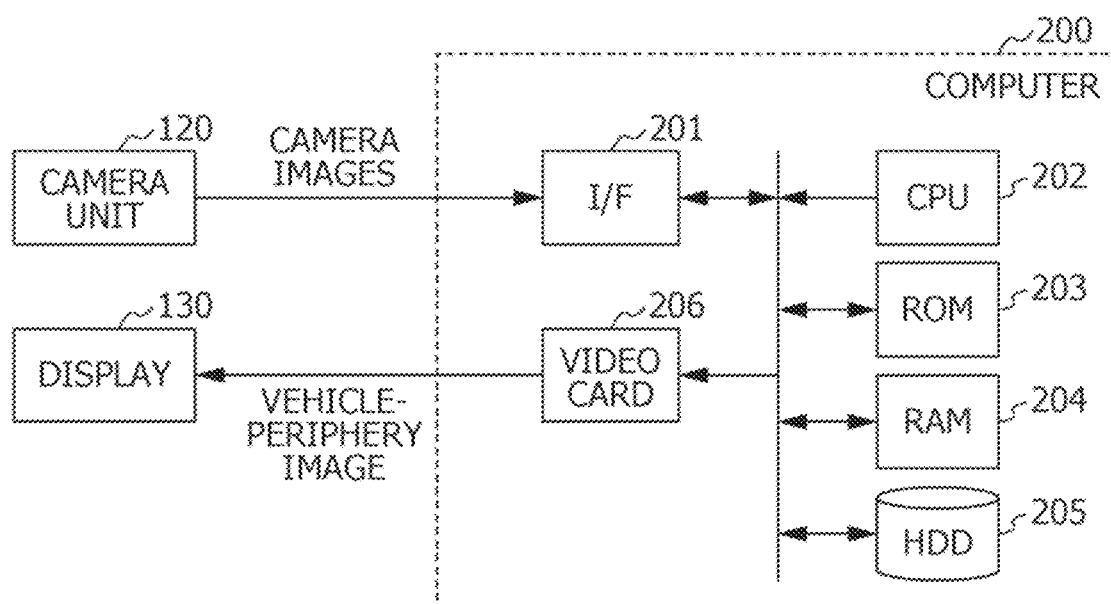
FIG. 2 is a block diagram illustrating a hardware configuration of the image generating apparatus according to the first embodiment.

FIG. 2 illustrates a hardware configuration of the image generating apparatus implemented by a computer.

In FIG. 2, a camera unit 120 captures images of objects in a space around the vehicle and outputs camera images, and then a computer 200 acquires the camera images and performs an image generating process, thereby displaying the resulting vehicle-periphery image on a display 130.

Examples of the camera unit 120 include a stereo camera and is, in particular, a fish-eye stereo camera. Examples of the display 130 include a liquid crystal display and an organic electroluminescent (EL) display. The display 130 may be installed in a vehicle or may be a head-mounted display that a user wears.

The computer 200 includes an interface (I/F) 201, a central processing unit (CPU) 202, a read only memory (ROM) 203, a random access memory (RAM) 204, a hard disk drive (HDD) 205, and a video card 206. Programs for operating the computer 200 are stored in the ROM 203 or the HDD 205 in advance. Note that the HDD 205 may be implemented by an apparatus having the same functions as the HDD, such as a solid state drive (SSD).

The CPU 202, which is a processor, reads and loads the programs from the ROM 203 or the HDD 205 to the RAM 204.

The CPU 202 executes each command that is coded in the programs loaded to the RAM 204.

In accordance with the execution of the programs, the I/F 201 loads the camera images from the camera unit 120 to the RAM 204. The video card 206 outputs the vehicle-periphery image generated in accordance with the execution of the programs, and the display 130 displays the vehicle-periphery image.

Note that the programs may be stored in, not only the ROM 203, which is a semiconductor device, and the HDD 205, but also a digital versatile disk (DVD)-ROM or the like. In addition, the programs may be transmitted through a wired or wireless network, broadcast, or the like and may be loaded to the RAM 204 in the computer 200.

Now, the operation of the image generating apparatus 100 will be described below with reference to FIG. 3.

Figure 3:
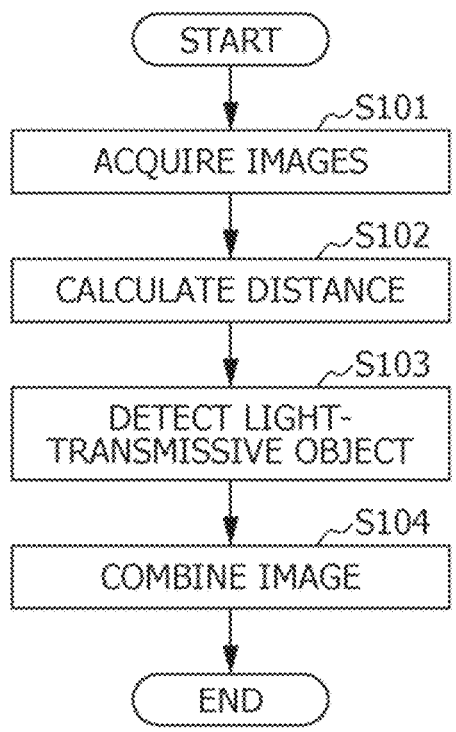
FIG. 3 is a flowchart illustrating the operation of the image generating apparatus according to the first embodiment.

FIG. 3 is a flowchart illustrating the operation of the image generating apparatus 100 in this embodiment.

S101: Image Acquiring Step

The image acquiring unit 101 acquires camera images from the camera unit 120. Examples of the camera images include stereo images. More specifically, the image acquiring unit 101 acquires a plurality of camera images captured by a plurality of cameras.

S102: Distance Calculating Step

On the basis of the acquired camera images and camera parameters (described later), the distance calculating unit 102 calculates the distance between a camera and a point in a space in the periphery of the vehicle to be projected in the camera images.

The point in the space in the periphery of the vehicle to be projected in the camera images corresponds to a target to be included in the camera images. That is, the distance calculating unit 102 calculates the distance between the camera and the target included in the camera images.

Examples of the target include all objects located in the periphery of the vehicle. Examples of the target include other vehicles, pedestrians, roads, and buildings. For example, the target may be a whole building, or the target may be identified in each pixel in the camera images.

In addition, the distance calculating unit 102 calculates the distance between one (also referred to as a reference camera) of the plurality of cameras and the target. For example, a memory may store the position of the reference camera, and the distance calculating unit 102 may acquire the position of the reference camera from the memory.

S103: Light-Transmissive Object Detecting Step

The light-transmissive object detecting unit 103 detects the position of the light-transmissive object or the reflective object in the camera images. That is, the light-transmissive object detecting unit 103 detects in which portion of the camera images the light-transmissive object or the reflective object is included.

The light-transmissive object detecting unit 103 may further estimate the distance between the camera and the light-transmissive object or the reflective object and may correct, to the estimated distance, the distance between the camera and the point in the space to be projected in the camera images at the detected position of the light-transmissive object or the reflective object.

S104: Image Generating Step

By using at least one of the camera images and the calculated distance, the image generating unit 104 generates the vehicle-periphery image, which is a generated image from a point of view different from the points of view of the camera images. Examples of the point of view that is different from the points of view of the camera images includes a point of view looking down on the vehicle from above and a point of view looking at the vehicle from behind.

A predetermined image is displayed at the position of the light-transmissive object or the reflective object in the vehicle-periphery image.

Note that each of the steps illustrated in FIG. 3 may be performed by the computer 200 illustrated in FIG. 2. Now, details of processing performed in each of the steps will be sequentially described below.

Figure 4:
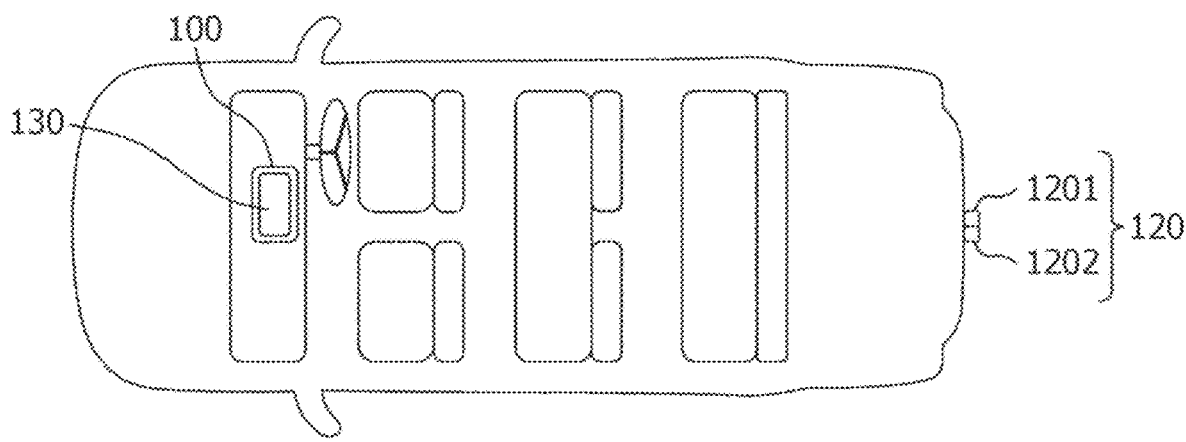
FIG. 4 illustrates an example of a camera unit, an image generating apparatus, and a display according to a second embodiment installed in a vehicle.

FIG. 4 illustrates an example of the image generating apparatus 100, the camera unit 120, and the display 130 installed in a vehicle. FIG. 4 is a view looking down on the vehicle from above.

Cameras 1201 and 1202 are provided at two positions in the rear portion of the vehicle so as to have different points of view and overlapping fields of view. The cameras 1201 and 1202 are included in the camera unit 120 that is a stereo camera. The image generating apparatus 100 is installed in a vehicle, and the display 130 is provided at a position where the driver in the cabin can view the display 130.

Note that the individual cameras 1201 and 1202 included in the camera unit 120 may capture images in synchronization with each other at regular time intervals and may output the images. In this case, concurrently with an image capturing operation performed by the camera unit 120, the image generating apparatus 100 performs S101 to S104 in accordance with a program specified in advance by the apparatus or the computer.

Figure 5A:
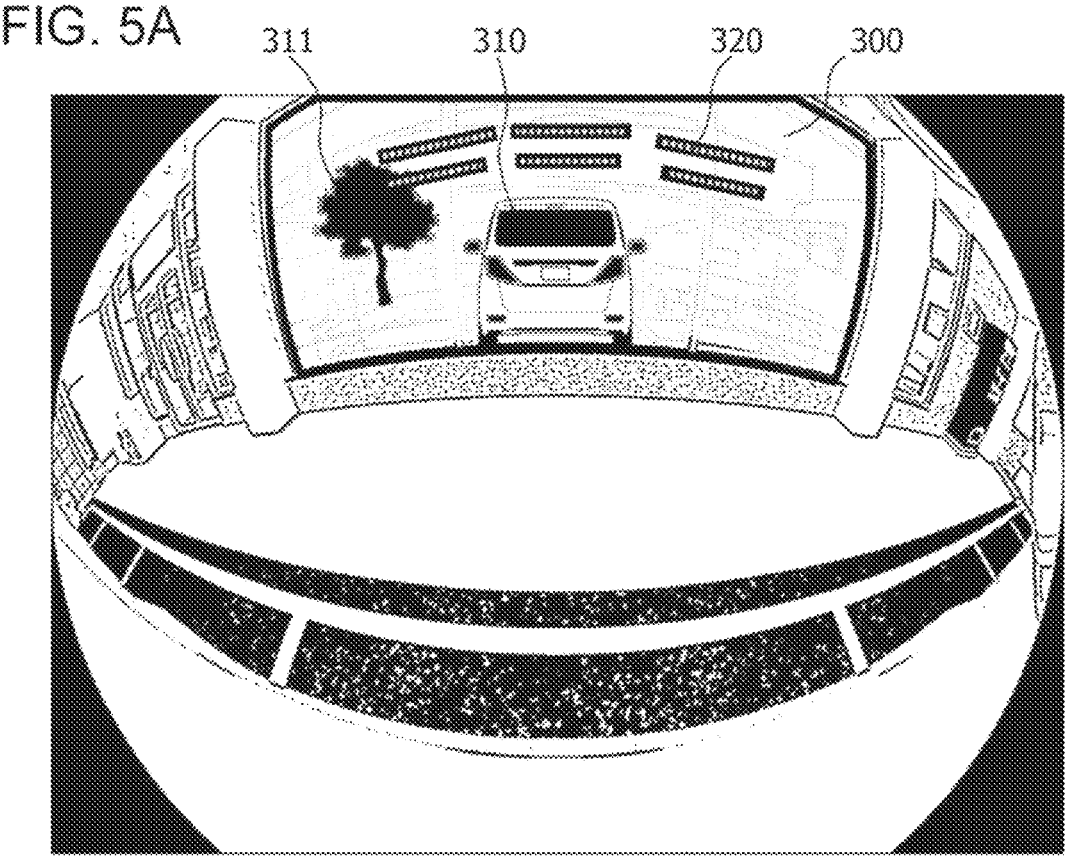
FIG. 5A illustrates a camera image according to the second embodiment.
Figure 5B:
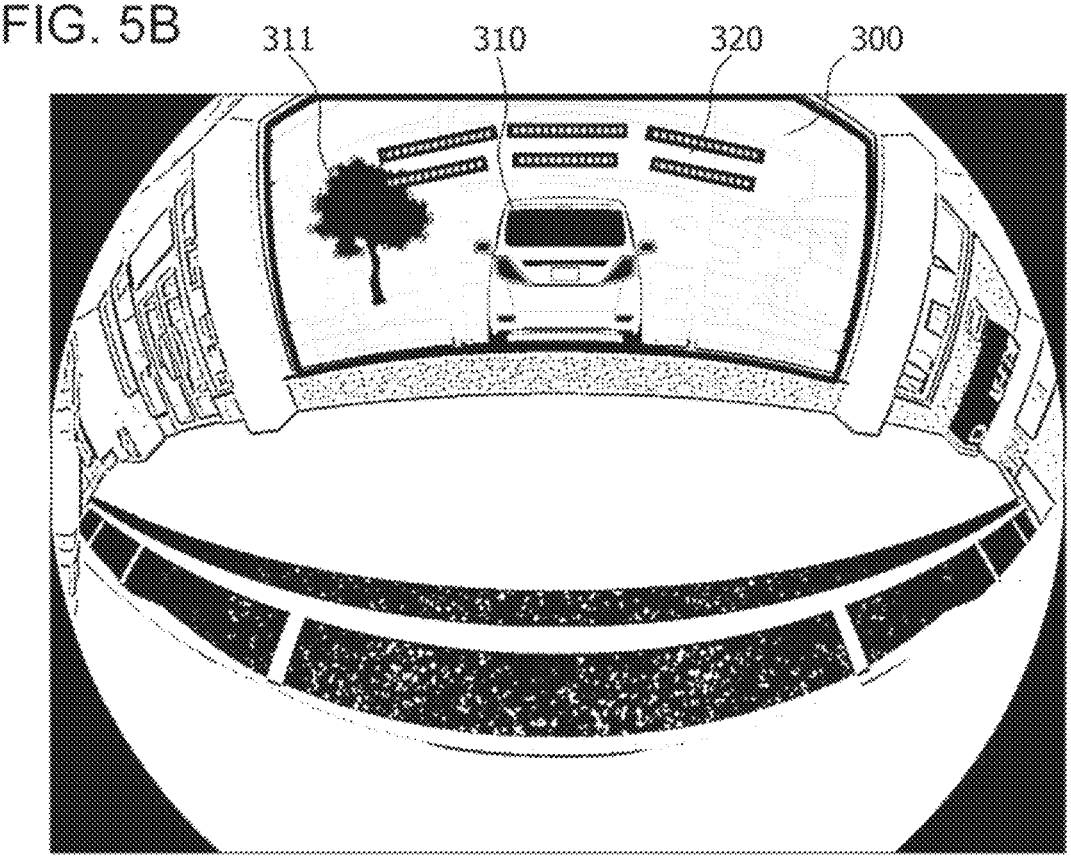
FIG. 5B illustrates a camera image according to the second embodiment.

FIGS. 5A and 5B illustrate examples of camera images captured during a parking scene. These examples are examples of a scene in which there is a parking lot in front of a building having windows that include a glass surface 300, and a vehicle driven by a driver is performing a parking operation with the reverse gear in a direction toward the glass surface 300. Accordingly, camera images captured by the rear cameras include a large area of the glass surface 300 behind the vehicle as illustrated in FIGS. 5A and 5B.

FIGS. 5A and 5B illustrate examples of camera images captured by the cameras 1201 and 1202, respectively, during the above scene. The camera images include both reflective components and a light-transmissive component displayed at the position of the glass surface 300. The camera images include a subject vehicle 310 and a tree 311 in the scene as the reflective components and an indoor lighting 320 behind the glass surface 300 as the light-transmissive component. Note that FIGS. 5A and 5B illustrate examples of contrast-enhanced and contour-enhanced images for ease of understanding.

In addition, although images captured by fish-eye cameras are illustrated here as examples, the camera images are not limited to images captured by fish-eye cameras. By using a fish-eye camera or a wide-viewing-angle camera, an image of a wide viewing angle can be captured by a single camera. However, by increasing the number of cameras, even by using cameras with a narrower viewing angle, the same effects can be obtained.

Now, step S101 to step S104 performed by the image generating apparatus 100 will be described in detail below.

The image acquiring unit 101 acquires a plurality of images that form camera images captured by each of the cameras 1201 and 1202.

In sets of images captured by different cameras, which are acquired by the image acquiring unit 101, the distance calculating unit 102 calculates, by stereopsis, three-dimensional positions of points in a space in the periphery of the vehicle to be projected in an image.

Details of the calculation of the three-dimensional positions performed by the distance calculating unit 102 will be described below.

The distance calculating unit 102 first reads camera parameters including internal and external parameters of the cameras 1201 and 1202, which are obtained in advance.

The relationship between internal parameters (f, k) of each camera, three-dimensional coordinates, and pixel coordinates is expressed by Expression 1.

$$\left. \begin{array}{l} u = \dfrac{1}{k} \dfrac{x}{\sqrt{x^2+y^2}} r \\ v = \dfrac{1}{k} \dfrac{y}{\sqrt{x^2+y^2}} r \\ r = f\theta \\ \theta = \tan^{-1}\left(\dfrac{\sqrt{x^2+y^2}}{z}\right) \end{array} \right\} \quad \text{Expression 1}$$

Expression 1 indicates the relationship between three-dimensional positions (x, y, z) of a camera in a coordinate system and pixel coordinates (u, v) where the internal parameter f represents a focal distance, and the internal parameter k represents a pixel size on an image sensor. The internal parameters (f, k) are obtained in advance by a widely known method typically called camera calibration. Note that although Expression 1 uses internal parameters when a projection model of a lens is equidistance projection, the projection model is not limited to a particular model, and another projection model such as stereographic projection or equisolid angle projection may be used.

The relationship between external parameters {Mq,r} of two cameras q and r that form a two-lens stereo camera and three-dimensional coordinates is expressed by Expression 2.

$$\left. \begin{array}{l} \{M_{q,r}\}, q = 1 \ldots 4, q \neq r \\ \begin{pmatrix} x_r \\ y_r \\ z_r \\ 1 \end{pmatrix} = M_{qr} \begin{pmatrix} x_q \\ y_q \\ z_q \\ 1 \end{pmatrix}, M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix} \end{array} \right\} \quad \text{Expression 2}$$

The external parameters {Mq,r} are a matrix representing the positional relationship between coordinate systems of the two cameras q and r. The matrix Mq,r represents a 4×4 matrix that converts a three-dimensional position ($x_q$, $y_q$, $z_q$) of the coordinate system of the camera q to a three-dimensional position ($x_r$, $y_r$, $z_r$) of the coordinate system of the camera r. The external parameters {Mq,r} are also obtained in advance by a widely known method typically called camera calibration as in the internal parameters.

The distance calculating unit 102 forms a set of two camera images (image data) captured by different cameras, the camera images being received by the image acquiring unit 101.

In the set of camera images, a plurality of three-dimensional positions in the camera images are calculated by stereopsis by using the camera parameters.

Then, the distance calculating unit 102 calculates a plurality of corresponding points between the two camera images.

That is, if two camera images captured by the cameras 1201 and 1202 are referred to as Ia and Ib, respectively, a plurality of corresponding points between the two images in a set of camera images (Ia, Ib) are detected.

The corresponding points between the two images means a set of points in the two images if a point of a subject in one image is also included in the other. For example, if the set of the camera images is (Ia, Ib), pixel coordinates ($u_{bn}$, $v_{bn}$) of a corresponding point in the camera image Ib, corresponding to pixel coordinates ($u_{an}$, $v_{an}$) in the camera image Ia, are detected for all pixels.

If the pixel coordinates ($u_{an}$, $v_{an}$) in the camera image Ia and the pixel coordinates ($u_{bn}$, $v_{bn}$) in the camera image Ib are corresponding points, a pixel value $i_{as}$ ($u_{an}$, $v_{an}$) and a pixel value $i_b$ ($u_{bn}$, $v_{bn}$) of the two points are equal to each other. This is referred to as brightness restriction. In addition, since a certain subject occupies a plurality of adjacent pixels in an image, there is a high possibility that a corresponding point of a pixel that is adjacent to the pixel coordinates ($u_{an}$, $v_{an}$) in the camera image Ia is near the pixel coordinates ($u_{bn}$, $v_{bn}$) in the camera image Ib. This is referred to as smoothness restriction. The corresponding points between the camera images (Ia, Ib) can be obtained by estimating an aggregation of sets of ($u_{an}$, $v_{an}$) and ($u_{bn}$, $v_{bn}$) that most satisfy the two conditions for the above-described brightness restriction and smoothness restriction.

Note that in order to acquire higher-density three-dimensional information on the periphery environment of the vehicle, it is desirable to calculate high-density corresponding points. The method for calculating the sets of pixel coordinates representing a high-density corresponding relationship between two images is specifically described in C. Zach, T. Pock, and H. Bischof, "A Duality Based Approach for Realtime TV-L1 Optical Flow," In Proceedings of the 29th DAGM conference on Pattern recognition, pp. 214-223, 2007, M. Werlberger, T. Pock, H. Bischof, "Motion Estimation with Non-Local Total Variation Regularization," IEEE Conference on Computer Vision and Pattern Recognition (CVPR), pp. 2464-2471, 13-18 Jun. 2010, and the like. Therefore, further detailed description will be omitted here. High-density corresponding points can be calculated with real precision by the method according to the above documents, and accordingly, higher-density three-dimensional information on the periphery environment of the vehicle can be calculated with higher accuracy.

Then, by solving simultaneous equations in Expression 3 by using the coordinates ($u_{an}$, $v_{an}$) and ($u_{bn}$, $v_{bn}$) of the corresponding points and external parameters $M_{b,a}$ and internal parameters $f_a$, $k_a$, $f_b$, $k_b$ of the cameras 1201 and 1202, which have been obtained in advance, the distance calculating unit 102 calculates a three-dimensional position ($x_{an}$, $y_{an}$, $z_{an}$) of each of the corresponding points.

Note that the three-dimensional position here is a coordinate value in a viewing coordinate system of the camera 1201.

$$u_a = \frac{1}{k_a} \frac{x_a}{\sqrt{x_a^2 + y_a^2}} f_a \tan^{-1}\frac{\sqrt{x_a^2 + y_a^2}}{z_a}$$

$$v_a = \frac{1}{k_a} \frac{y_a}{\sqrt{x_a^2 + y_a^2}} f_a \tan^{-1}\frac{\sqrt{x_a^2 + y_a^2}}{z_a}$$

$$u_b = \frac{1}{k_b} \frac{x_b}{\sqrt{x_b^2 + y_b^2}} f_b \tan^{-1}\frac{\sqrt{x_b^2 + y_b^2}}{z_b}$$

$$v_b = \frac{1}{k_b} \frac{y_b}{\sqrt{x_b^2 + y_b^2}} f_b \tan^{-1}\frac{\sqrt{x_b^2 + y_b^2}}{z_b}$$

$$\begin{pmatrix} x_a \\ y_a \\ z_a \\ 1 \end{pmatrix} = M_{b,a} \begin{pmatrix} x_b \\ y_b \\ z_b \\ 1 \end{pmatrix}$$

Expression 3

The method for calculating the three-dimensional position by using a two-lens stereo method from the corresponding points between two camera images and the positions of the two cameras and the conversion of the coordinate value between two three-dimensional coordinate systems are specifically described in Takashi Matsuyama, et al. "Computer Vision", New Technology Communications Co., Ltd. pp. 123-137 and the like. Therefore, detailed description will be omitted here.

Lastly, the distance calculating unit 102 outputs as positional information the results of plural calculations of the corresponding points between two camera images and the three-dimensional positions thereof. Examples of information to be output are illustrated below.

Expression 4 represents an aggregation $P_{q,r}$ of pieces of positional information $p_{q,r,n}$ of Nq corresponding points between two camera images Iq and Ir obtained by the two cameras q and r. In addition, $\{P_{q,r}\}$ represents the positional information of all sets of images.

$$\begin{aligned} P_{q,r} &= \{p_{q,r,n}\}, (n = 1 \ldots N_q) \\ &= \{(u_{qn}, v_{qn}, u_{rn}, v_{rn}, x_{qn}, y_{qn}, z_{qn})\} \end{aligned}$$

Expression 4

The positional information may be pixel-pair information (pixel coordinates and corresponding pixel coordinates) that identifies two pixels as in Expression 4 or may be information including the three-dimensional position corresponding to a pair of pixels identified by the pixel-pair information.

Note that the camera parameters may be parameters that are obtained in advance to be used as fixed values by the distance calculating unit 102 or may be read from a parameter storing unit that is additionally and externally provided. By externally providing the parameter storing unit, if the parameters vary, the parameter values can be corrected easily.

Through the above processing, the three-dimensional position of each corresponding point in the images can be obtained.

Figure 6A:
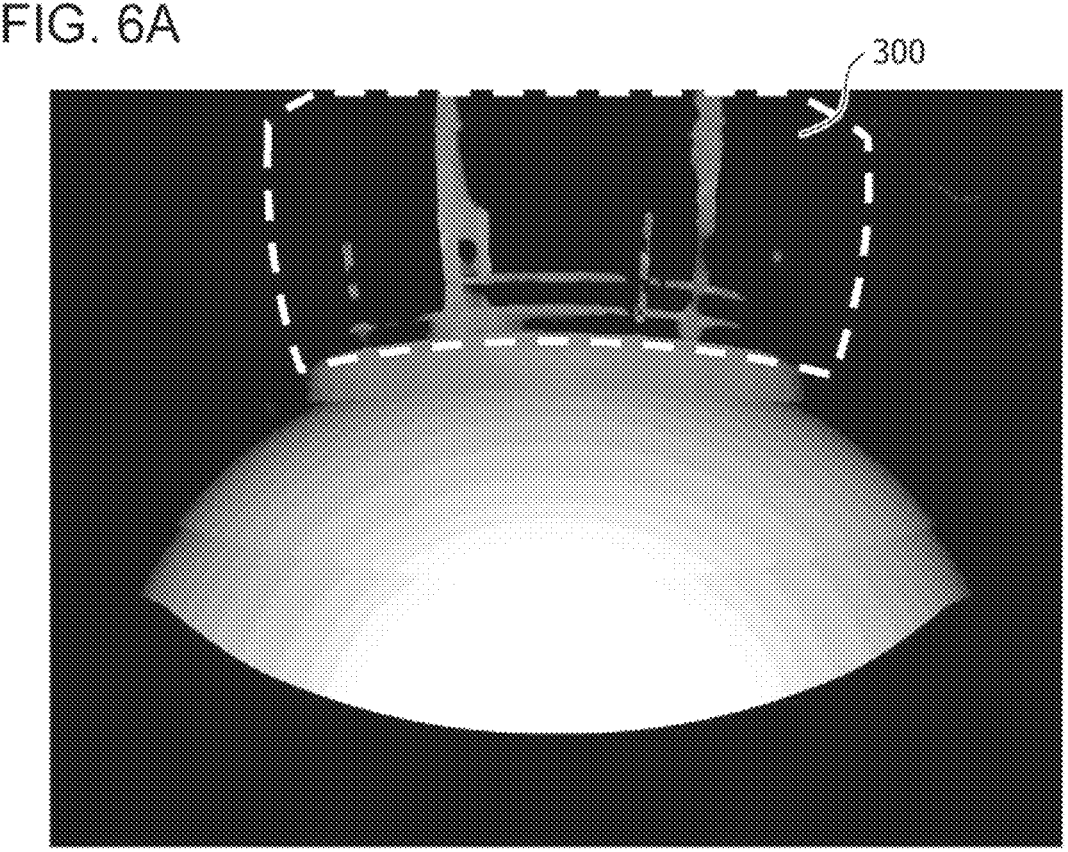
FIG. 6A illustrates an example of a distance image calculated on the basis of camera images.

FIG. 6A illustrates an example of a distance image based on the distance calculated by the distance calculating unit 102 from the images in FIGS. 5A and 5B captured by the stereo camera. The variation in brightness (shades) represents the distance from the camera. That is, a higher brightness indicates a smaller distance from the camera, and a lower brightness indicates a larger distance from the camera. Note that the region of the subject vehicle and a part corresponding to vignetting of the camera are masked in black (brightness=0) for visibility.

Figure 6B:
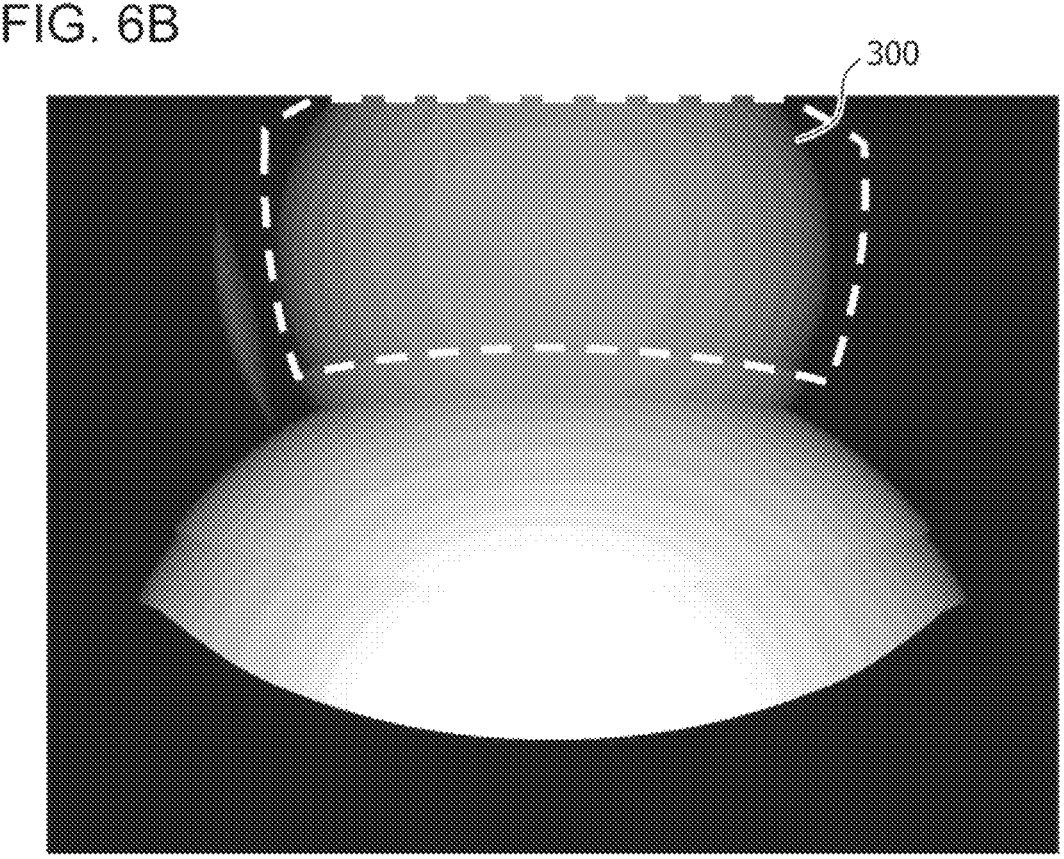
FIG. 6B illustrates an example of a correct distance image.

FIG. 6B illustrates a distance image (simulation image created on the basis of a known model) created from a correct three-dimensional position of the glass surface 300.

Comparing the distances to the glass surface 300, it is understood that the distance illustrated in FIG. 6A is calculated to be larger than the correct distance illustrated in FIG. 6B. Such an error in measuring the distance is explained as follows.

Typically, in a region with a larger brightness gradient, such as an edge or a texture region in an image, the corresponding points between two images can be calculated more accurately. On the other hand, a transparent glass surface has a small brightness gradient due to glass itself, and accordingly, it is not possible to calculate the corresponding points accurately.

Figure 7A:
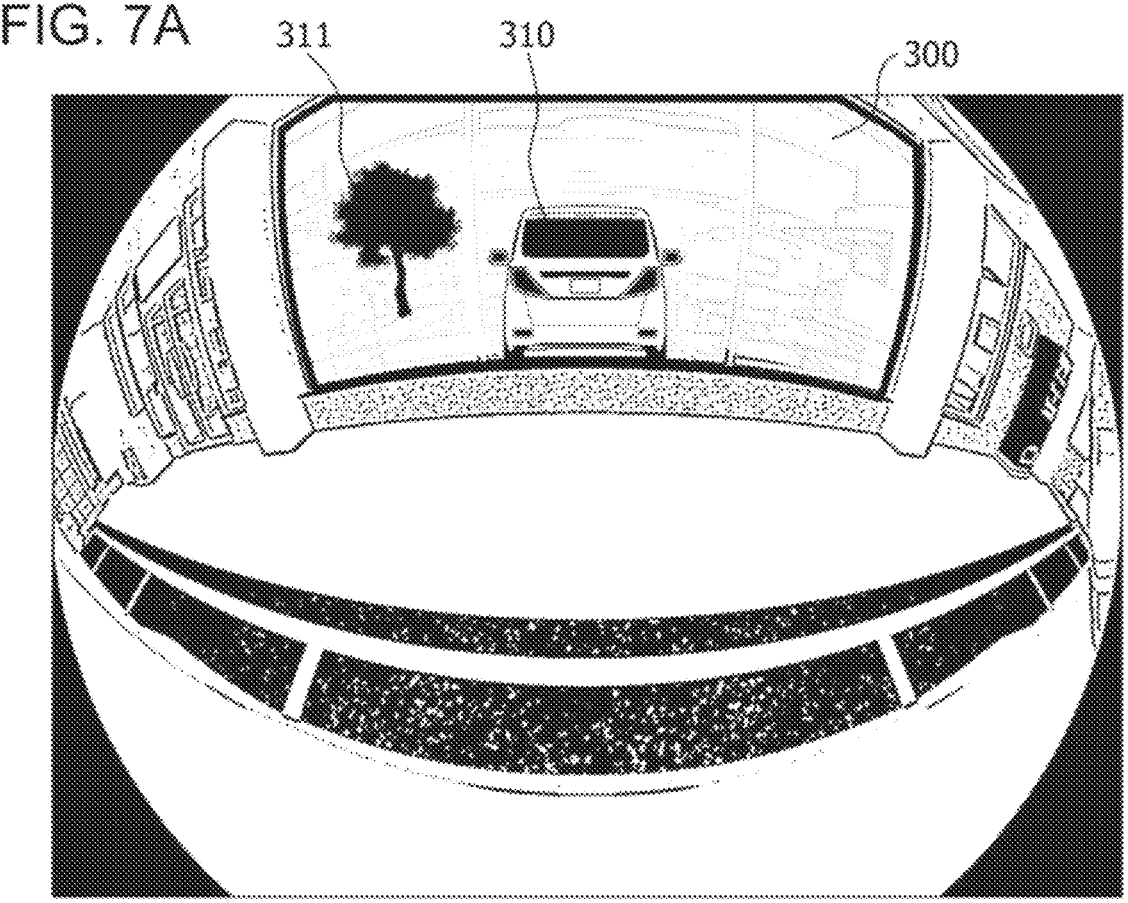
FIG. 7A illustrates an example of a reflective component in a camera image.

FIG. 7A illustrates, for explanation, an image of only components reflected on the glass surface 300, such as the subject vehicle 310 and the tree 311, which are included in FIG. 5A.

Figure 7B:
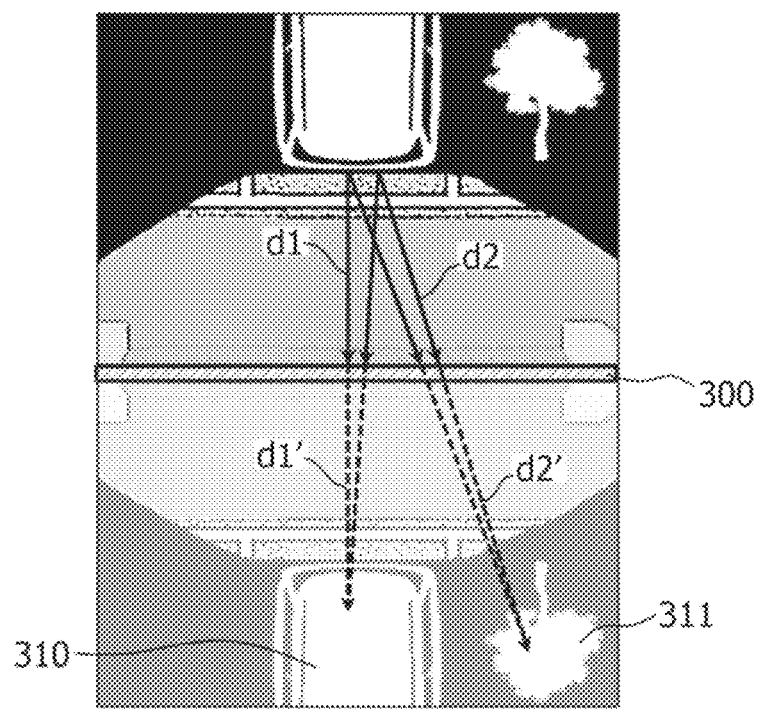
FIG. 7B illustrates measurement of a distance to the reflective component in the camera image.

In this example, as illustrated in FIG. 7B, as the distances to the subject vehicle 310 and the tree 311, distances d1' and d2' to virtual images, not distances d1 and d2 to the glass surface 300, are measured. This is because calculated corresponding points between the stereo camera images are corresponding points between reflected textures. Accordingly, as indicated by intersecting dotted lines in FIG. 7B, the distances to the virtual images of the subject vehicle 310 and the tree 311, not the distances to the glass surface 300, are measured.

Figure 8A:
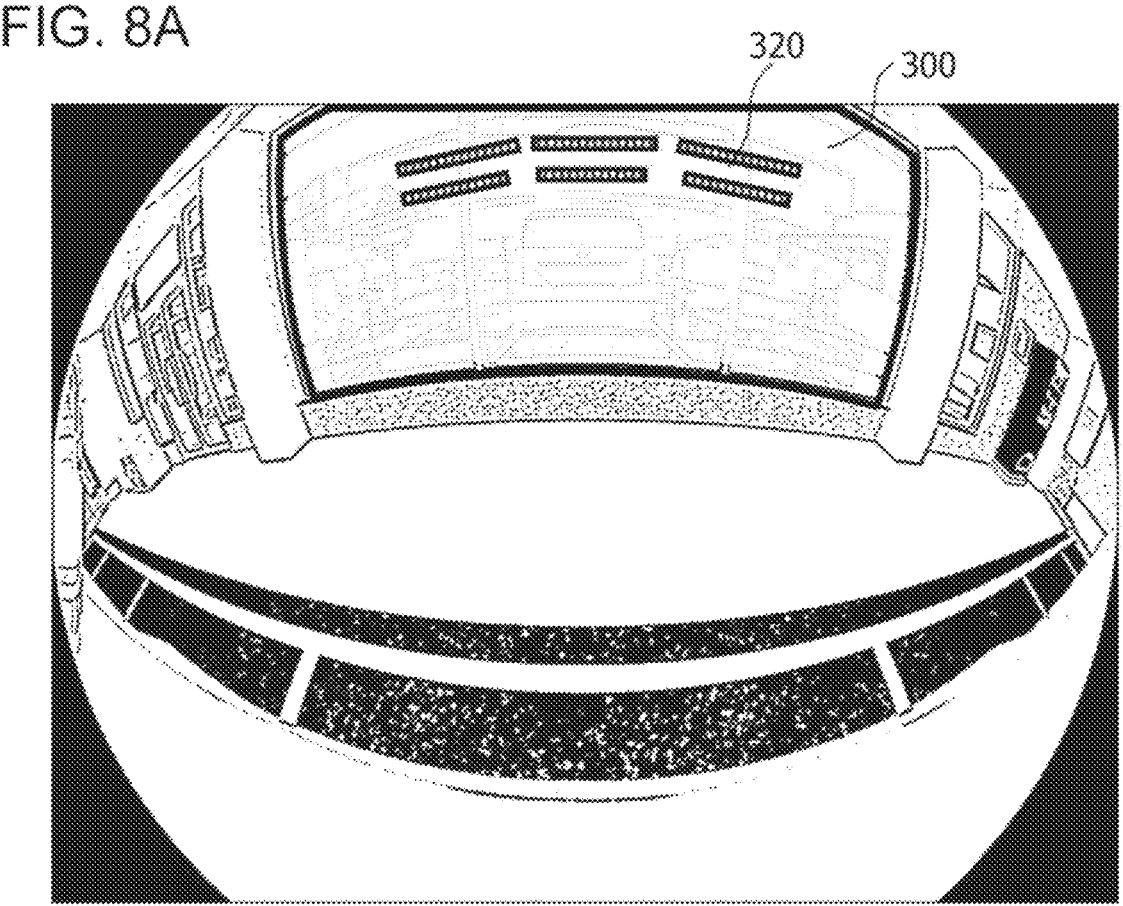
FIG. 8A illustrates an example of a light-transmissive component in a camera image.

FIG. 8A illustrates, for explanation, an image of only a component that is transmitted through the glass surface 300, such as the indoor lighting 320, which is included in FIG. 5A.

Figure 8B:
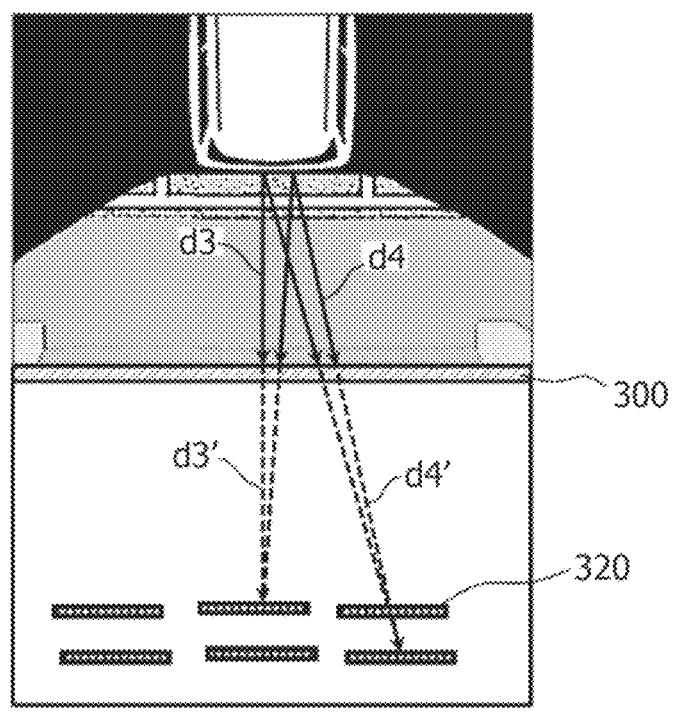
FIG. 8B illustrates measurement of a distance to the light-transmissive component in the camera image.

Also in this example, as illustrated in FIG. 8B, as the distance to the indoor lighting 320, distances d3' and d4' to the main body of the indoor lighting 320, not distances d3 and d4 to the glass surface 300, are measured. This is because calculated corresponding points between the stereo camera images are corresponding points between transmitted textures. Accordingly, as indicated by intersecting dotted lines in FIG. 8B, the distance to the indoor lighting 320, not the distance to the glass surface 300, is measured.

Thus, the distance to a virtual image of an object represented as a reflective component or a light-transmissive component reflected on a glass surface and the distance to the object behind the glass surface are calculated in some cases. That is, the distance to the object represented at the position of the glass surface 300 in a camera image is estimated to be larger than the actual distance between the glass surface 300 and the camera. This results in a wrong determination that no object is present at the position of the glass surface 300.

To address such an issue, the light-transmissive object detecting unit 103 detects the position (hereinafter also referred to as a glass region) of a light-transmissive object or a reflective object in the camera image and estimates the distance between a camera and the light-transmissive object or the reflective object. Further, the three-dimensional position of a point in the space, calculated by the distance calculating unit 102, to be projected at the detected position of the light-transmissive object or the reflective object in the camera image is corrected by using the estimated distance. This prevents the distance to the light-transmissive object or the reflective object from being estimated to be larger than the actual distance. In other words, a wrong determination that no object is present at the position of the light-transmissive object or the reflective object is prevented.

The detection of the position of the light-transmissive object or the reflective object and the estimation of the distance thereto performed by the light-transmissive object detecting unit 103 will be specifically described. Note that the light-transmissive object or the reflective object is referred to as a glass surface in the following description.

It is difficult to estimate the position of the glass surface and the distance between a camera and the glass surface in a camera image by a typical stereo method. Accordingly, it is necessary to detect the position of the glass surface and to estimate the distance to the glass surface by the following method, for example, which is different from the stereo method.

As a method for estimating the region of a light-transmissive object such as a glass surface, it is effective to apply an image recognizing method using machine learning or the like. The method by which the above-described window region including the glass surface and a window frame can be detected in an image is disclosed in J. Liu, T. Korah, V. Hedau, V. Parameswaran, R. Grzeszczuk and Y. Liu, "Entrance Detection from Street-View Images," Scene Understanding Workshop (SUNw), 2014. In this method, a plurality of candidate rectangular regions are calculated in the image, and a region that is "likely to be an entrance" on a probability basis is selected from among the calculated candidates on the basis of knowledge obtained in advance. In this document, mainly in order to detect an entrance, the distance between rectangular regions to be detected as the knowledge is restricted. However, if this method is applied to the detection of a window region, by decreasing the restriction value, it is possible to detect a window region in which windows are arranged side by side.

It is needless to say that the method for detecting the window region on the basis of learning is not limited to the method according to the above document, and for example, the detection may also be performed by a recognition method based on a very large database such as deep learning. It is typically known that the recognition can be performed with high accuracy if a large amount of learning data can be prepared in advance, and accordingly, the window region can be detected more accurately.

The above method based on recognition is advantageous because the window region can be detected by using camera images used for stereopsis without additionally providing a special sensor or the like.

On the other hand, it is known that the method based on recognition is likely to be affected by the variation in appearance. For example, if the appearance of an object such as a window frame is reflected on a glass surface, it might not be possible to successfully detect the entire glass surface as a glass region in some cases.

In contrast, it is widely known that the reflection of an object can be recognized by using light polarization characteristics. For example, in order to prevent reflection, a polarization filter is typically used. This uses a feature that light reflected on a glass surface is polarized in a certain direction but light transmitted through a glass surface is not polarized. That is, if a rotatory polarization plate is provided in front of a lens of the camera unit 120 and an image having different polarization directions is captured, reflection occurs, that is, a specular reflection component is present, at a part where sine-wave-form changes in brightness are seen. By obtaining a region with such changes in brightness, even if a reflective component having an appearance like a window frame is present in the glass region, a part that may be a glass region with high possibility can be obtained.

On the other hand, the method for estimating a glass region by using the above-described polarization characteristics assumes that the subject and the camera are both stationary when capturing a plurality of images while the polarization plate is rotated. Accordingly, if the camera and/or the subject moves, unfortunately, it is not possible to estimate the glass region accurately.

In contrast, it is known that light in a wavelength band of a visible light region passes through a glass surface, but light in a wavelength band of a far-infrared region is absorbed in a glass surface. That is, if an image of a glass surface is captured by a far-infrared camera, neither transmitted light nor reflected light is obtained, and the brightness is decreased in the glass region. That is, even if the same method, stereopsis, is employed, the obtained distance to the glass region may largely differ with high possibility between using a far-infrared stereo camera and using a normal stereo camera. Accordingly, if a far-infrared stereo camera is additionally installed, during a scene, a region in which the distance obtained by using the far-infrared stereo camera and the distance obtained by using the distance calculating unit 102 largely differ from each other, and the region having a fixed area may be detected as the glass region.

Note that if a special camera is additionally installed as described above, it is necessary to perform calibration in advance to calculate camera parameters indicating the positional relationship and the orientation relationship between the camera unit 120 and the additionally installed camera. By performing matrix conversion by using the camera parameters, the three-dimensional position of the glass surface calculated by the camera unit 120 by stereopsis and the three-dimensional position of the glass surface calculated by using the additionally installed far-infrared stereo camera can easily fit the same coordinate system. In the above case, images captured by the far-infrared camera may be received by the image acquiring unit 101 to be input to the light-transmissive object detecting unit 103, for example.

The light-transmissive object detecting unit 103 estimates the three-dimensional position of a point in a space in the periphery of the vehicle to be projected in the glass region and replaces the three-dimensional position of the point calculated by the distance calculating unit 102 with the newly estimated three-dimensional position.

Figure 9:
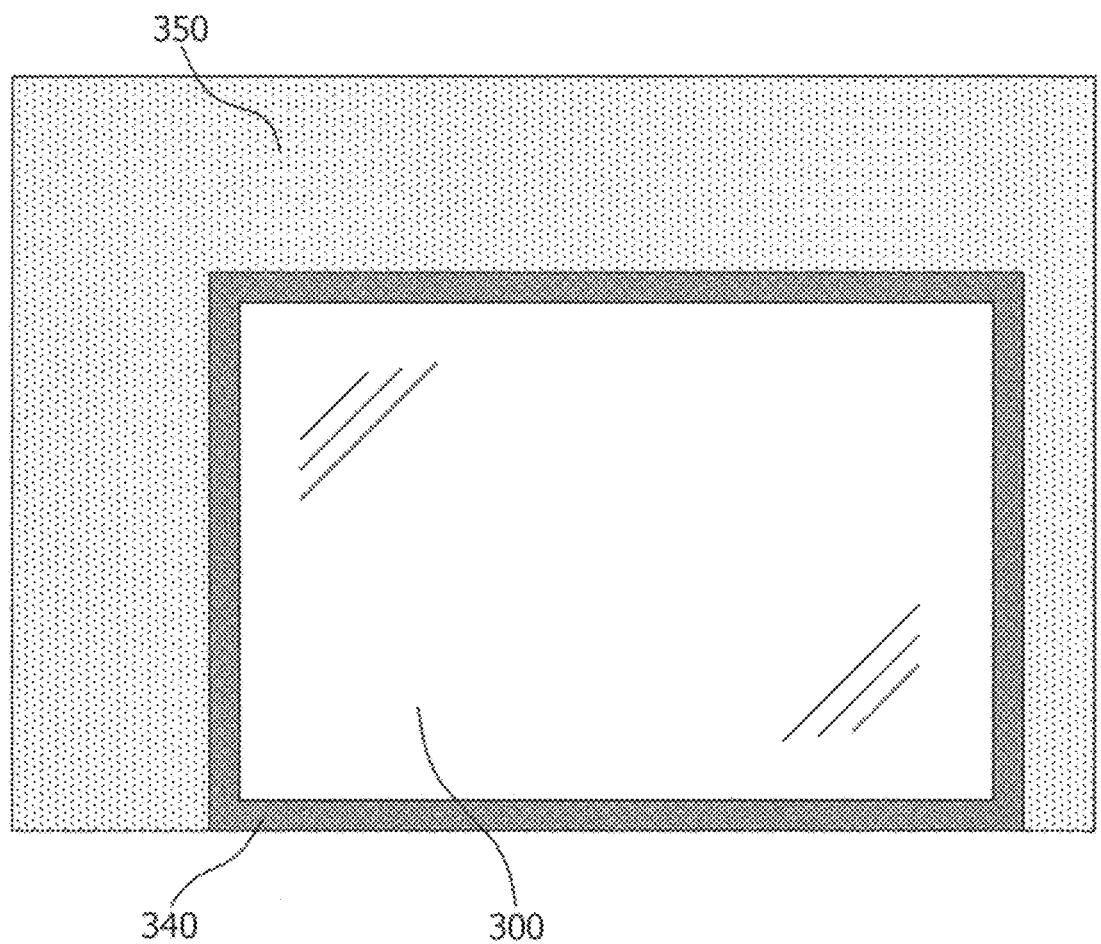
FIG. 9 illustrates examples of a glass surface, a window frame, and a building.

As illustrated in FIG. 9, in many cases, the glass surface 300 is provided within a window frame 340 in a building 350. Accordingly, a non-light-transmissive object region on the circumference of the glass surface 300 may be considered to be the window frame 340, and on the basis of the three-dimensional position of the window frame 340 calculated by a stereo method from camera images, the position of the glass surface 300 can be estimated. Since the window frame 340 is a non-light-transmissive object, its three-dimensional position is calculated accurately by the distance calculating unit 102. Accordingly, on the basis of the three-dimensional position of the window frame 340, a plane in a three-dimensional space is calculated, and the plane is estimated to be the three-dimensional position of the glass surface 300.

Typically, a plane in a three-dimensional space can be estimated on the basis of at least coordinates of three points. Accordingly, by selecting three points from points on the window frame 340 and applying robust estimation such as Random Sample Consensus (RANSAC), the plane formed by the points on the window frame 340 can be calculated, and the plane can be estimated as the three-dimensional position of the glass surface 300. The light-transmissive object detecting unit 103 replaces the three-dimensional position of the glass region calculated by the distance calculating unit 102 with the three-dimensional position of the glass surface 300 estimated through the above procedure, thereby correcting three-dimensional information of a scene including the glass surface 300.

Lastly, on the basis of the three-dimensional information of the scene, which is corrected by the light-transmissive object detecting unit 103, the image generating unit 104 generates a vehicle-periphery image. Specifically, an image seen from a virtual camera that is provided above the vehicle and that has such a field of view that looks down on the periphery of the vehicle from above is generated by so-called computer graphics (CG) rendering on the basis of the three-dimensional information of the scene, images captured by the camera unit 120, and predetermined camera parameters of the camera unit 120 and the virtual camera, and the generated image is output.

Now, the operation of the image generating unit 104 when generating a generated image Is by using the positional information $\{P_{q,r}\}$ (see Expression 4) generated from a set of rear stereo images will be described below.

First, the image generating unit 104 calculates pixel coordinates $(u_s, v_s)$ of all corresponding points $p_{q,r,n}$ according to the positional information $\{P_{q,r}\}$ in the generated image Is. The pixel coordinates in the generated image Is can be calculated by the following method. The three-dimensional position $(x_s, y_s, z_s)$ of a virtual camera s in a coordinate system is calculated by using the three-dimensional position $(x_q, y_q, z_q)$ of the camera q in a coordinate system and external parameters $M_{q,s}$ of the camera q and the virtual camera s corresponding to the generated image Is included in the corresponding points $p_{q,r,n}$. Then, by using the three-dimensional position $(x_s, y_s, z_s)$ and internal parameters (f, k) of the virtual camera s, the pixel coordinates $(u_s, v_s)$ of the virtual camera s are calculated (Expression 5).

$$\left. \begin{array}{l} u_s = \frac{1}{k} f \frac{x_s}{z_s} \\ v_s = \frac{1}{k} f \frac{y_s}{z_s} \\ \begin{pmatrix} x_s \\ y_s \\ z_s \\ 1 \end{pmatrix} = M_{q,s} \begin{pmatrix} x_q \\ y_q \\ z_q \\ 1 \end{pmatrix} \end{array} \right\} \quad \text{Expression 5}$$

The image generating unit 104 calculates a pixel value from pixel values $i_q$ $(u_{qn}, v_{qn})$ and $i_r$ $(u_m, v_m)$ of the corresponding points in two images Iq and Ir and sets the pixel value as the pixel value of a pixel at the coordinates $(u_s, v_s)$ in the generated image Is. As a method for calculating one pixel value from the pixel values $i_q$ $(u_{qn}, v_{qn})$ and it $(u_m, v_m)$ of the corresponding points in two images Iq and Ir, an average pixel value is used here.

This processing is repeatedly performed for all the positional information $\{P_{q,r}\}$, and the pixel values in the generated image Is are set. In the above manner, since the pixel value of each pixel in a virtual camera image can be calculated on the basis of images captured by the camera unit 120, an image as if captured by the virtual camera can be generated.

Figure 10B:
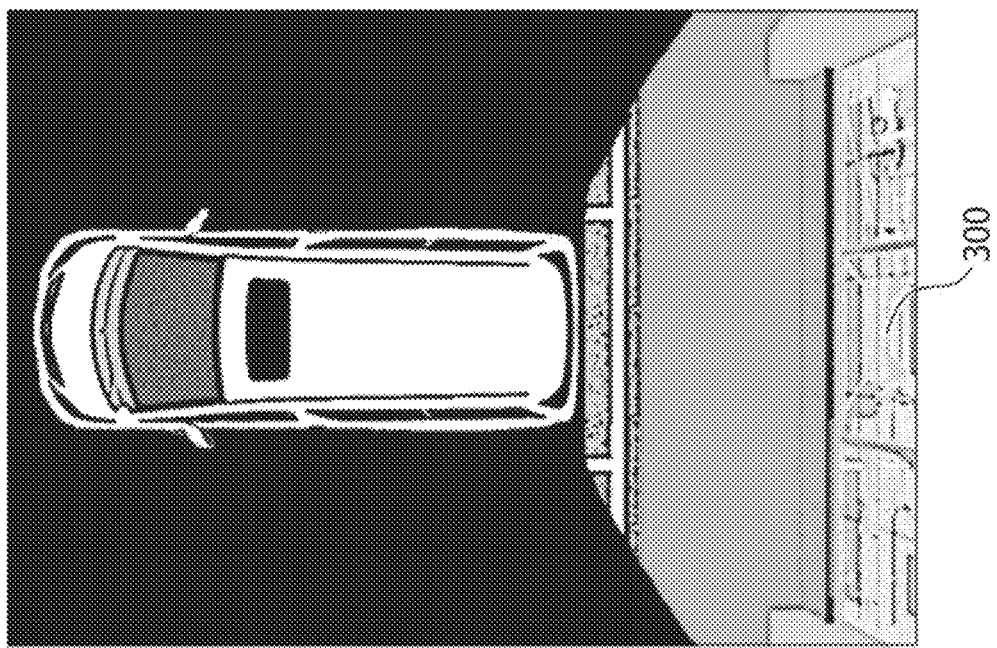
FIG. 10B illustrates an example of a generated image according to the second embodiment.
Figure 10A:
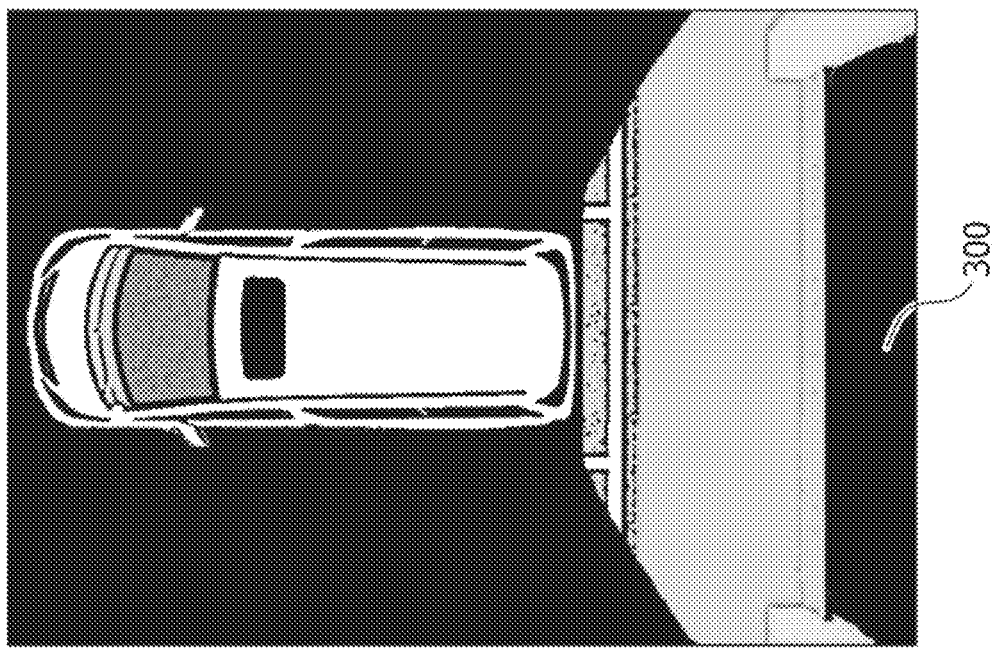
FIG. 10A illustrates an example of a vehicle-periphery image from a point of view looking down from above according to the related art.

In this case, an image is combined at the three-dimensional position of the glass region detected by the light-transmissive object detecting unit 103, and an image captured by the camera unit 120 is combined at the position of the glass surface 300 in FIG. 10A, where nothing is combined according to the related art. That is, an image illustrated in FIG. 10B can be combined, and accordingly, the driver can be notified of the presence of the glass surface 300 and its position.

Note that the method for generating an image from a given point of view on the basis of three-dimensional information is specifically described in J. D. Foley, S. K. Feiner, A. V. Dam, J. F. Hughes, "Computer Graphics: Principles and Practice", Ohmsha, Ltd., pp. 231-279, and therefore detailed description thereof will be omitted. Although the method using transformation of the point of view on a pixel basis has been described herein, in order to obtain a smoother and higher-density image with a transformed point of view, a polygon such as a square or triangle may be formed by using adjacent points in a three-dimensional point group in a two- or three-dimensional space, and the point of view may be transformed.

Note that the method for generating an image is not necessarily limited to the above-described method for generating an image on the basis of all three-dimensional positional information.

As described above, the position of an end (specifically, the window frame) of the glass surface in a three-dimensional space can be measured by stereo distance measurement, and on the basis of the position in the three-dimensional space, the position of an end (i.e., the glass region in the generated image) of the glass surface in the generated image can be obtained. Accordingly, the glass region in the camera image may be two-dimensionally transformed into a shape of the glass region in the generated image, and the shape may be pasted on the generated image. Thus, the combination result that is similar to that of FIG. 10B can be obtained at a lower calculation cost.

Figure 11A:
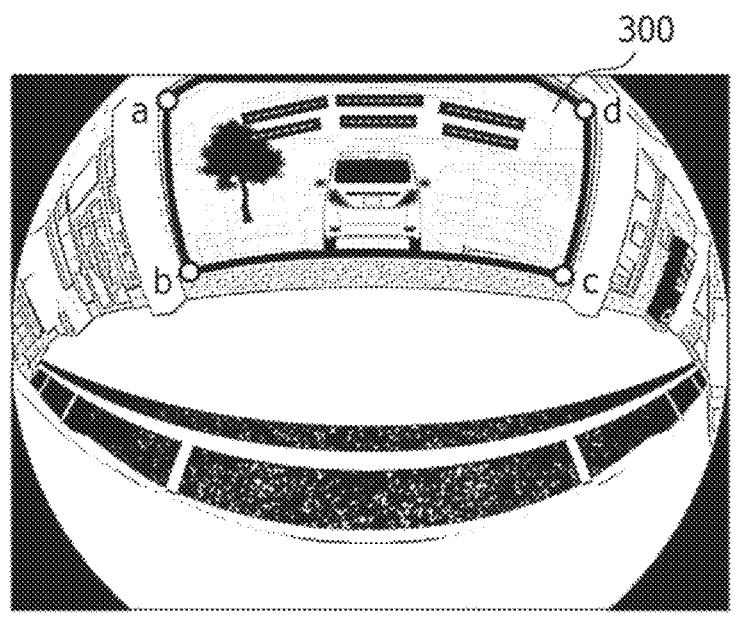
FIG. 11A illustrates an example of a camera image according to the second embodiment.
Figure 11B:
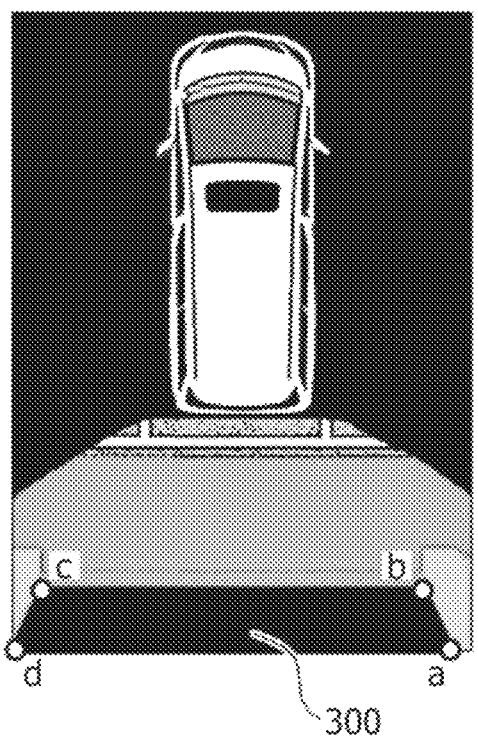
FIG. 11B illustrates an example of a vehicle-periphery image from a point of view looking down from above according to the related art.

FIG. 11A illustrates a camera image captured by the camera unit 120 that is placed at the rear portion of the vehicle. Points a to d represent end points of the glass surface 300. FIG. 11B illustrates a generated image obtained by transforming the point of view of the camera image in FIG. 11A to a point of view looking down on the glass surface 300 and the vehicle from a virtual camera above the subject vehicle by a method according to the related art. Nothing is combined to the glass surface 300.

Figure 11C:
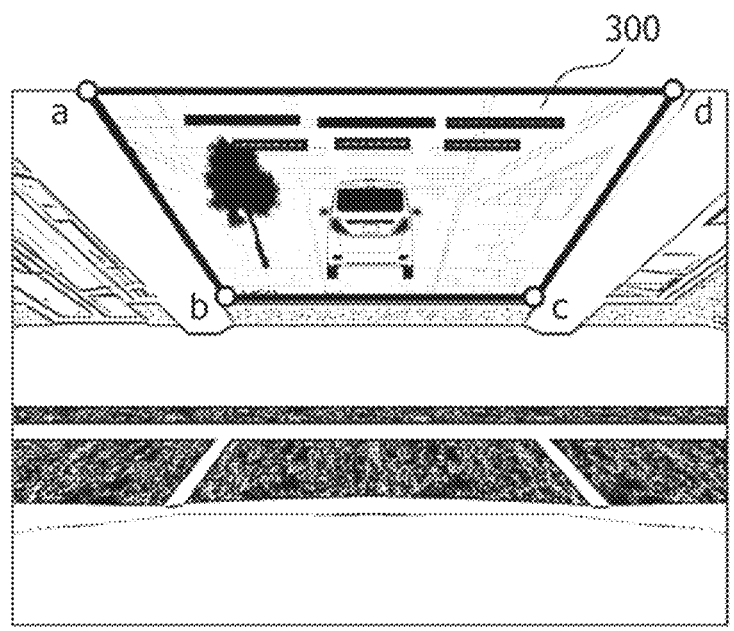
FIG. 11C illustrates an example of a modified image according to the second embodiment.
Figure 11D:
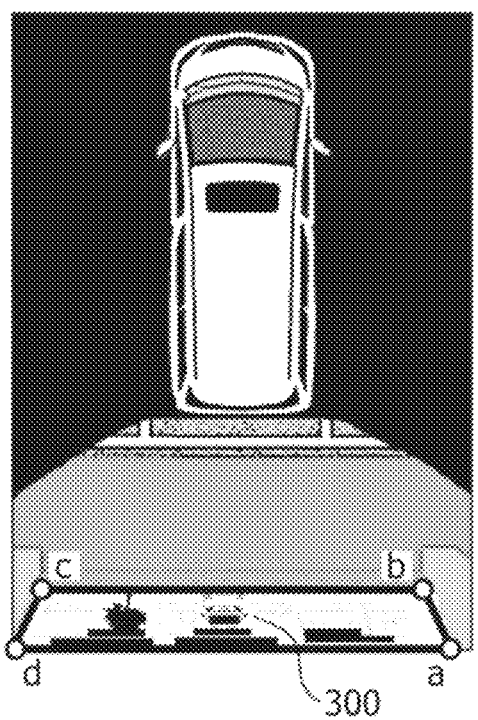
FIG. 11D illustrates an example of a vehicle-periphery image according to the second embodiment.

FIG. 11C illustrates a modified image from which strain is excluded from the camera image in FIG. 11A on the basis of camera parameters. The image in a region defined by the points a to d in the modified image in FIG. 11C is subjected to two-dimensional transformation, and the transformed image is attached to the region defined by the points a to d in the generated image in FIG. 11B, and thereby a generated image in FIG. 11D is obtained.

The processing in the above manner is effective in that heavy processing such as three-dimensional polygon processing can be omitted, thereby the processing can be performed at a high speed. Note that the generated image in FIG. 11D may also be obtained, without the modified image in FIG. 11C, by two-dimensionally transforming an image in the region defined by the points a to d in FIG. 11A and attaching (i.e., combining) the transformed image to the region defined by the points a to d in the generated image in FIG. 11B.

In summary of the above description, the image generating apparatus and an image generating method according to this embodiment of the present disclosure has a feature that a predetermined image is displayed in a form different from the forms of other objects at the position of a light-transmissive object or a reflective object (e.g., glass surface) in a generated image (e.g., vehicle-periphery image).

The predetermined image is, for example, a part of a camera image that is obtained, after correcting the distance to the light-transmissive object or the reflective object by a method different from stereo distance measurement, by rendering the camera image by using the corrected distance. As another example, the predetermined image is a part of a camera image that is two-dimensionally transformed and attached at the position of the light-transmissive object or the reflective object. Furthermore, as will be described later, the predetermined image may be an image representing a specific artificial design. In other words, the part of a camera image here has the same point of view as the camera image while the generated image has a point of view different from that of the camera image. That is, the part of a camera image means an image having a point of view that is not transformed.

That is, the predetermined image is displayed in a form different from that of an object other than the light-transmissive object or the reflective object in the generated image, and the driver can be notified of the presence of the light-transmissive object or the reflective object. Accordingly, a vehicle-periphery image is obtained, which is the generated image useful in assisting safe driving and in which the driver can easily recognize the light-transmissive object or the reflective object.

Second Embodiment

The first embodiment has described an example in which the camera unit 120 provided at the rear portion of the vehicle acquires an image of a backward area of the vehicle and the three-dimensional position in the ambient environment. This does not limit the place at which the camera is installed and the image capturing orientation and/or the image capturing area, and the camera may be installed at another position and/or in another image capturing orientation as long as images of the periphery of the vehicle can be captured.

Figure 12A:
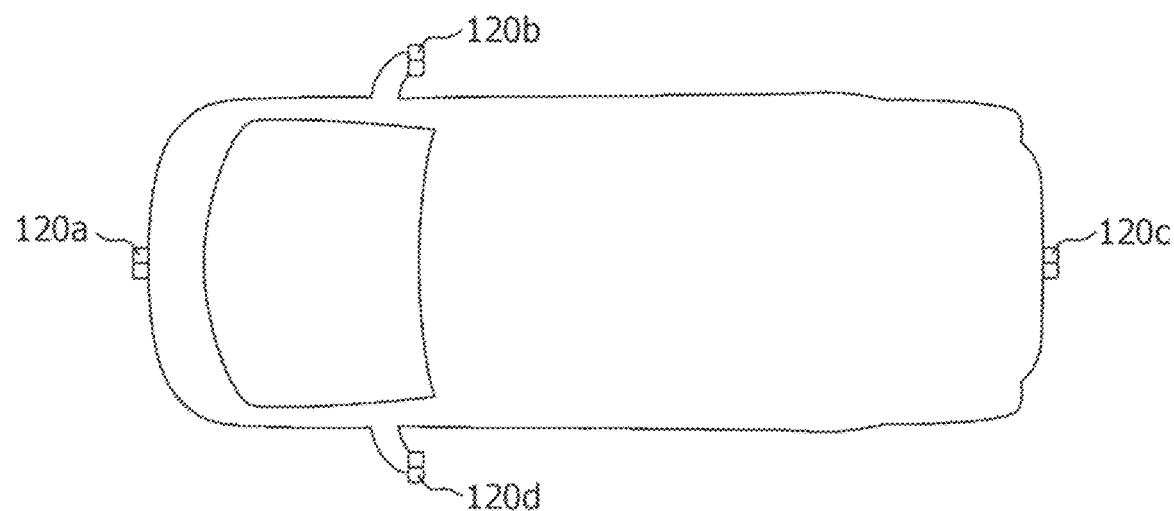
FIG. 12A illustrates another example of camera units according to the second embodiment installed in a vehicle.
Figure 12B:
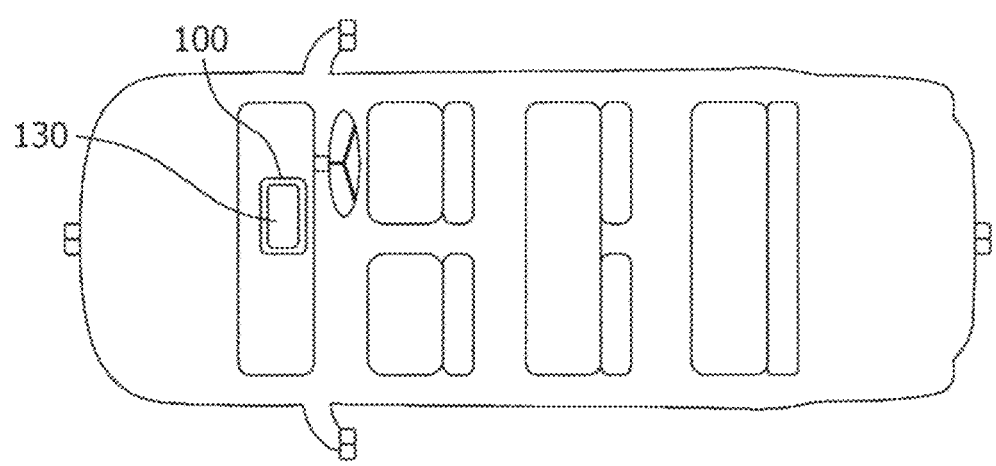
FIG. 12B illustrates another example the image generating apparatus and the display according to the second embodiment installed in a vehicle.
Figure 13A:
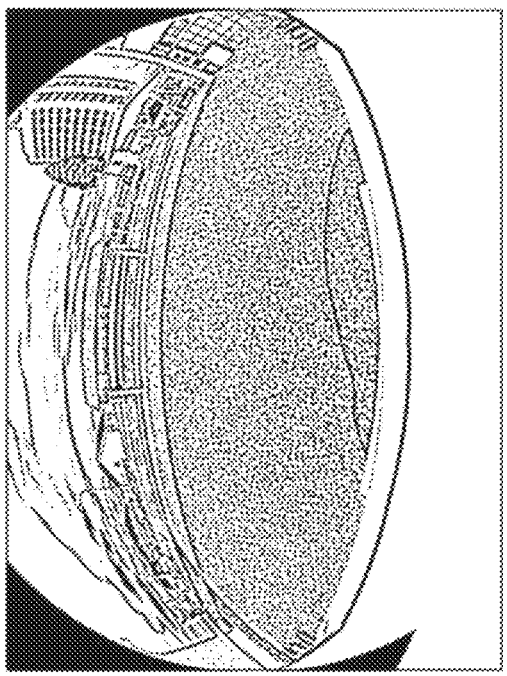
FIG. 13A illustrates an example of a camera image according to the second embodiment.
Figure 13B:
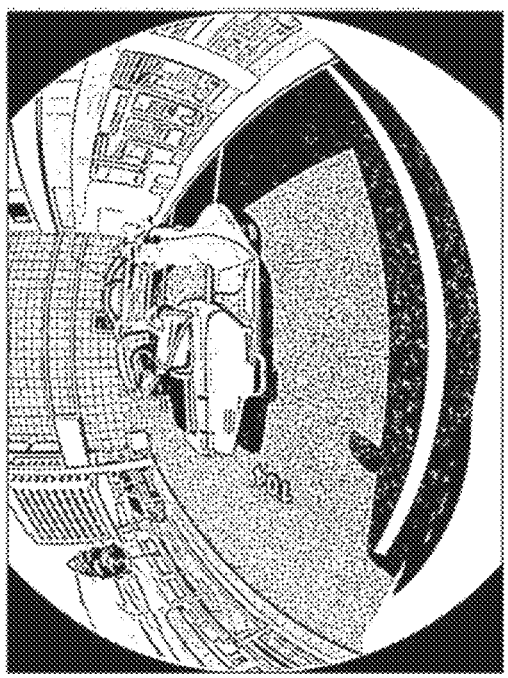
FIG. 13B illustrates an example of a camera image according to the second embodiment.
Figure 13C:
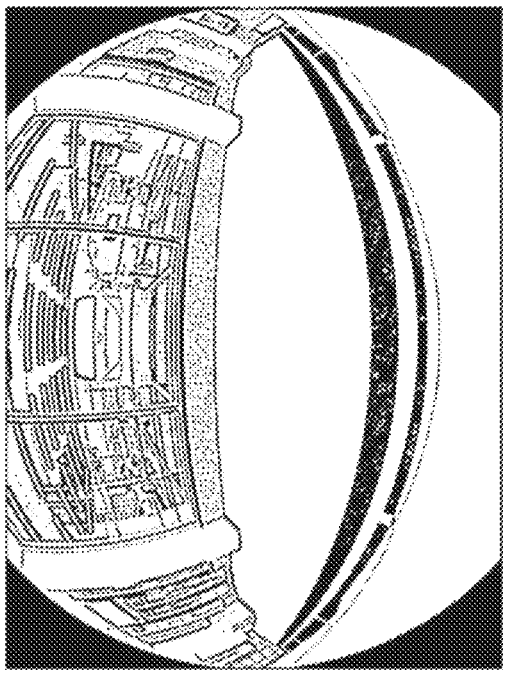
FIG. 13C illustrates an example of a camera image according to the second embodiment.
Figure 13D:
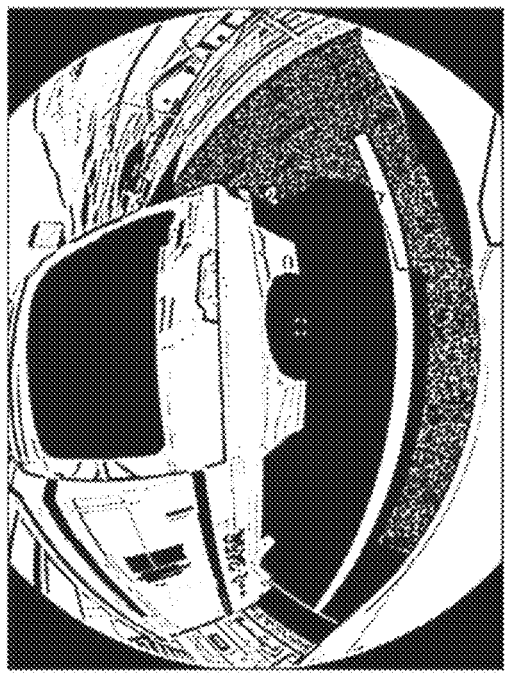
FIG. 13D illustrates an example of a camera image according to the second embodiment.

FIGS. 12A and 12B illustrate another example of the image generating apparatus 100, the camera unit 120, and the display 130 installed in a vehicle.

FIGS. 12A and 12B are views looking down on the vehicle from above. Camera units 120a to 120d are each a stereo camera that can measure distances and are provided at four portions: the front, right, rear, and left of the vehicle. The individual cameras are distinguished from one another by referring to letters "a" to "d" at the last reference numeral, but each of the cameras is referred to as the camera unit 120 unless the individual cameras are distinguished from one another. By installing a fish-eye or wide-viewing-angle stereo camera at each portion, it is possible to measure distances all around the vehicle without a blind spot and to generate an image with a transformed point of view.

FIGS. 13A to 13D illustrate examples of images captured during a parking scene in a parking lot in front of a store having glass windows. Note that FIGS. 13A to 13D are subjected to the same processing as FIGS. 5A and 5B for ease of understanding.

If the camera units 120a to 120d are each a fish-eye stereo camera, FIGS. 13A to 13D illustrate examples of camera images captured by either camera in each of the stereo cameras. The image captured by the front camera unit 120a corresponds to FIG. 13A, the image captured by the right camera unit 120b corresponds to FIG. 13B, the image captured by the rear camera unit 120c corresponds to FIG. 13C, and the image captured by the left camera unit 120d corresponds to FIG. 13D. It is understood that images of the periphery of the vehicle are captured without a blind spot.

Note that the camera units 120a to 120d desirably capture images in synchronization with one another at regular time intervals and output the images.

Figure 14A:
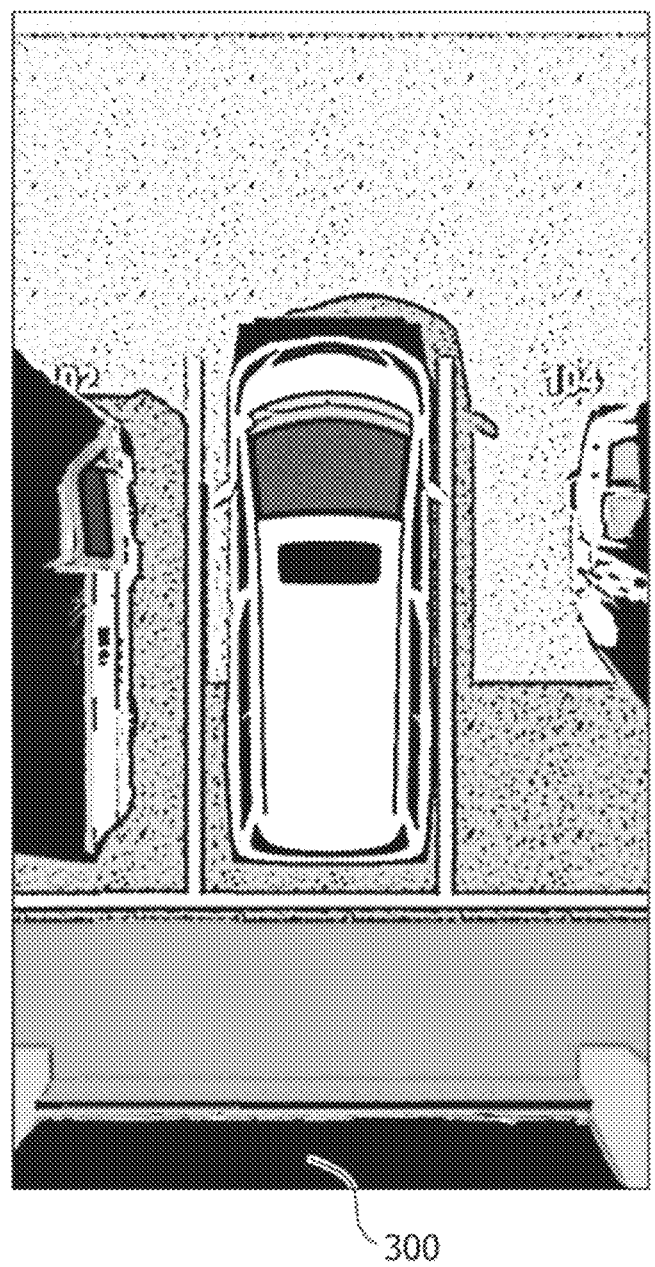
FIG. 14A illustrates an example of a vehicle-periphery image from a point of view looking down from above according to the related art.

FIG. 14A illustrates an example of a vehicle-periphery image generated by a method according to the related art on the basis of moving images captured in the above manner without a blind spot. In addition, FIG. 14B illustrates an example of a vehicle-periphery image further displaying a glass region by the method described in the first embodiment.

Figure 14B:
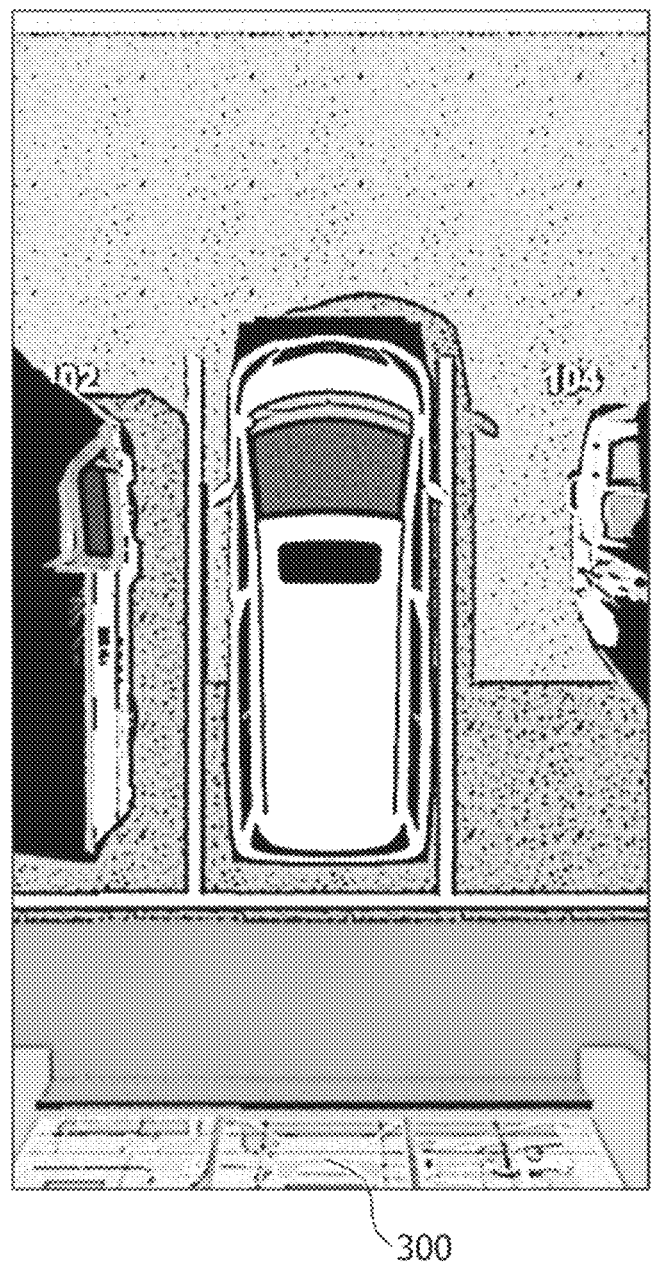
FIG. 14B illustrates an example of a generated image according to the second embodiment.

Thus, by performing an image generating process by using the vehicle-periphery image without a blind spot, an image from a point of view looking down on the entire periphery of the vehicle from above can be generated as illustrated in FIG. 14B, and accordingly, it is possible to present to the driver moving images from which the driver can more easily view how large a glass surface is and in which direction the glass surface is in the periphery of the vehicle.

Note that the image displayed in the glass region has been described above by taking an example of generating an image by using images captured by the camera unit 120. Since the image generating apparatus according to this embodiment of the present disclosure aims to notify the driver of the presence of a glass surface, the image displayed in the glass region is not limited to the above-described camera image, but may be, for example, an image representing a specific artificial design.

Figure 14C:
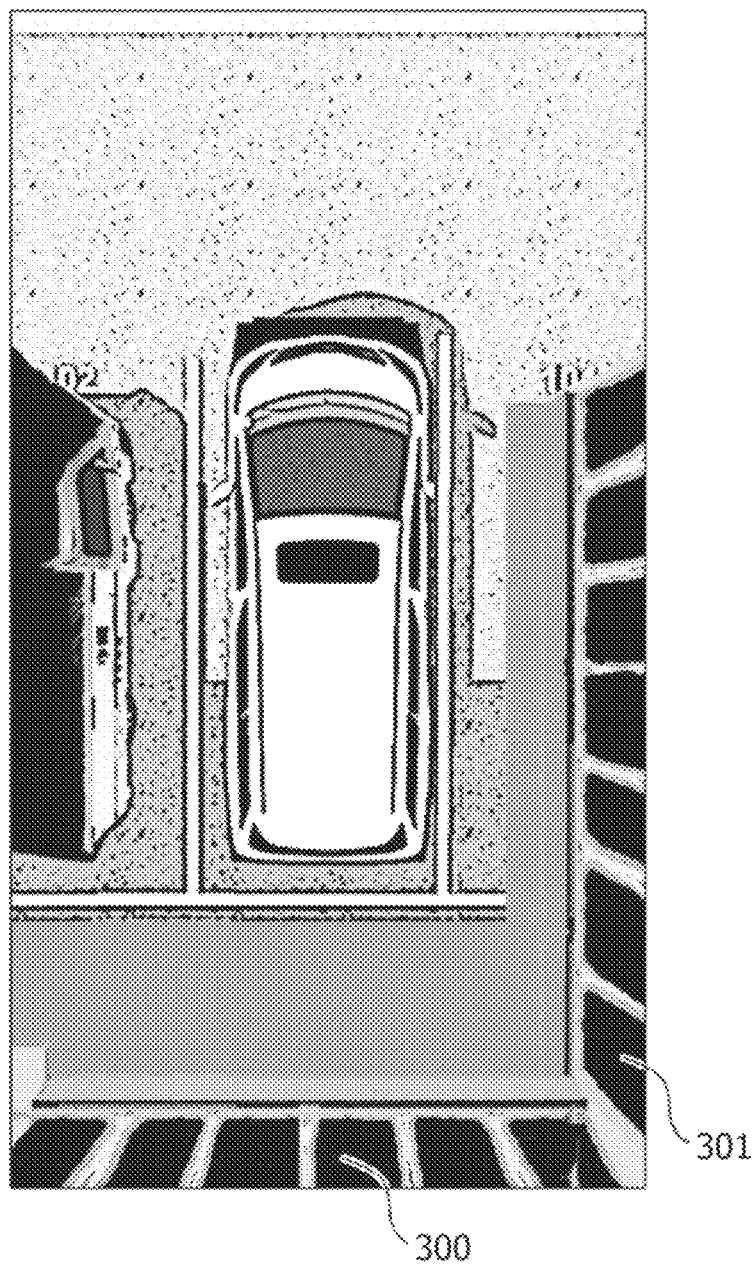
FIG. 14C illustrates another example of a generated image according to the second embodiment.

For example, it is also possible to generate moving images from which the driver can easily view the presence of the glass surface by displaying straight lines extending from the surface of a road in the vertical direction (extending upward from the surface of a road in the vertical direction) are combined to the glass region. By drawing lines that are vertical to the surface of a road, it is possible to display an image from which the position and inclination of the surface is easily understood. For example, if the glass surface 300 and a glass surface 301 are present behind and in a side of the vehicle, an image in FIG. 14C may be displayed.

Third Embodiment

The image generating apparatus 100 described in the first embodiment combines images captured by a plurality of cameras to a glass region without any modification and obtains a generated image.

Figure 15A:
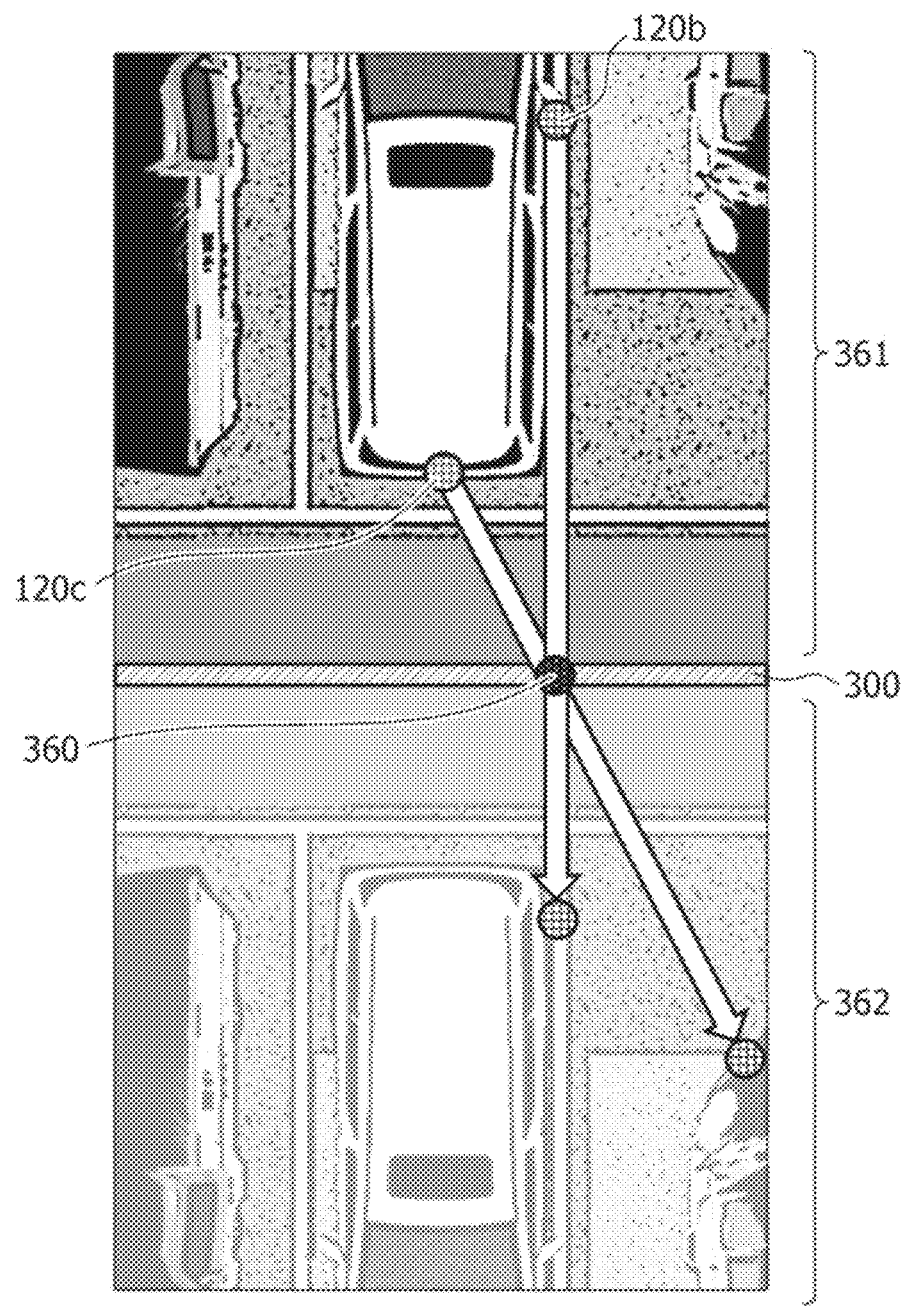
FIG. 15A is a conceptual diagram illustrating an issue to be addressed in a third embodiment.

FIG. 15A illustrates an issue in this combining processing, in which a real image 361 is illustrated above the glass surface 300 and a virtual image 362 reflected on the glass surface 300 is illustrated below the glass surface 300.

Figure 15B:
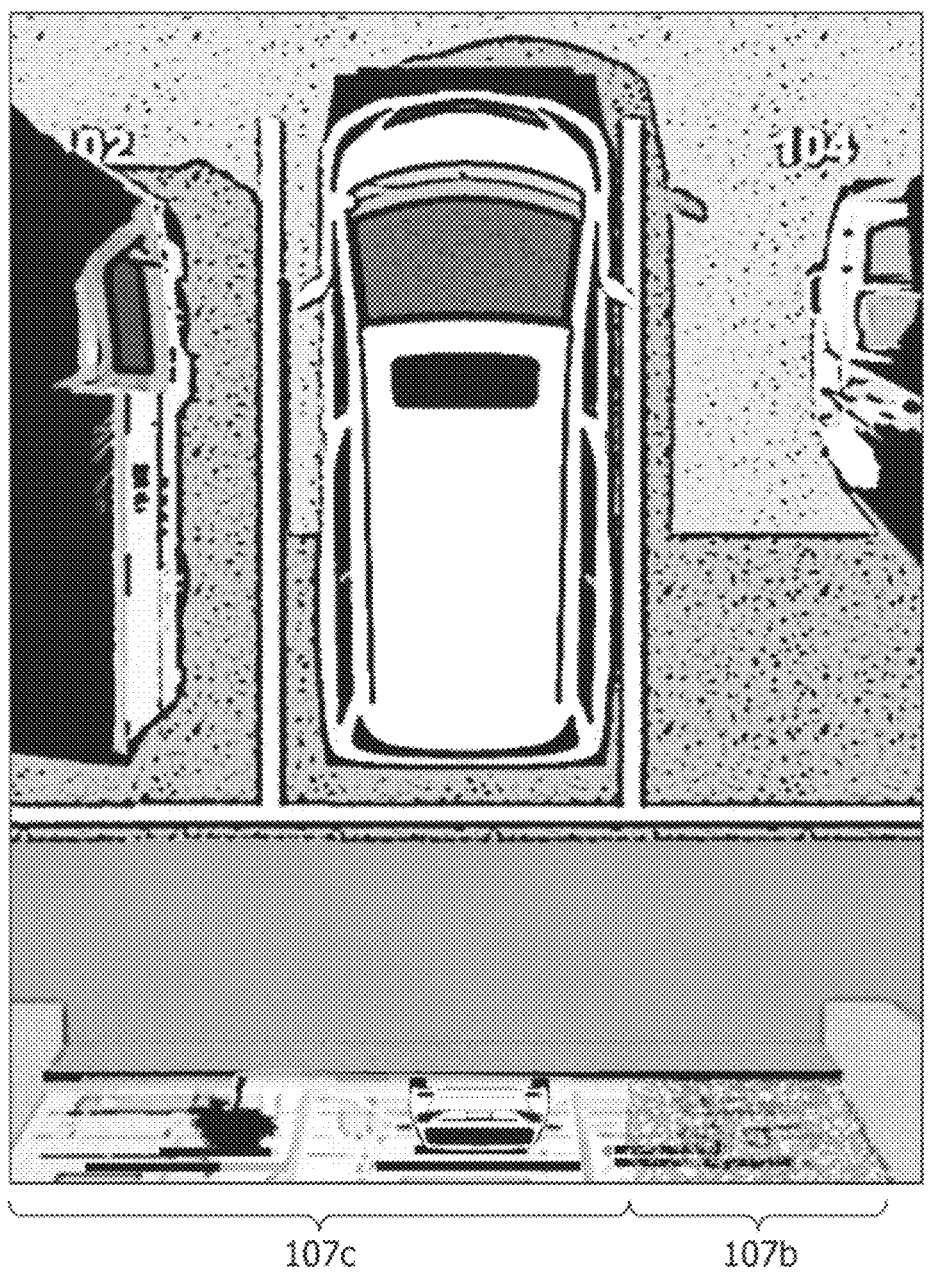
FIG. 15B illustrates an example of a vehicle-periphery image from a point of view looking down from above according to the related art.

As illustrated in FIG. 15A, light beams that pass through a point-of-interest 360 on the glass surface 300 and that enter the camera units 120b and 120c having different points of view are from different objects (or virtual images) through the glass surface 300. This results in brightness mismatch between adjacent pixels at the time of image generation. Accordingly, as illustrated in FIG. 15B, the generated image may be difficult to view.

Accordingly, in this embodiment, in order to address the above-described issue, the image generating unit 104 selects a camera with the highest ratio of the glass surface 300 in a part where the fields of view of cameras overlap with each other in the glass region and uses a camera image captured by the camera to be combined.

Figure 15C:
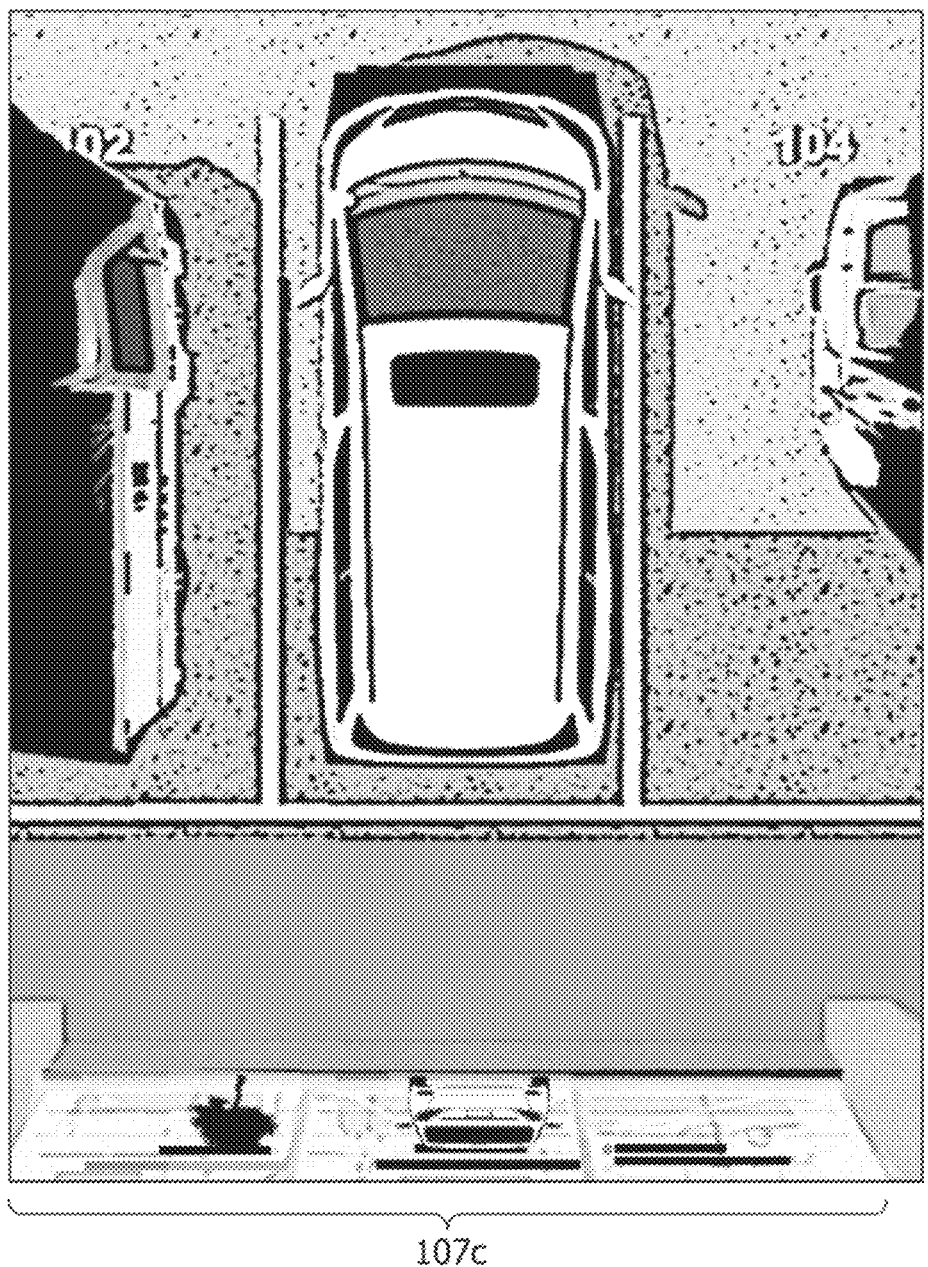
FIG. 15C illustrates an example of a generated image according to the third embodiment.

Accordingly, as illustrated in FIG. 15C, since the selected camera image is used at the time of combining an image to the glass region, it is effective in that a camera image with the largest area of the glass surface is combined to the glass region and that the image in the glass region is easily viewed.

Note that according to the above method, if there are a plurality of glass regions during a scene, a camera with the largest area of each glass surface is not selected in some cases. In contrast, if there are a plurality of glass regions during a scene, a camera with the highest ratio of a glass region in the field of view may be selected for each glass region. Thus, it is effective in that a camera with the largest area of each glass surface is selected and that the image of each glass region is viewed more easily.

Fourth Embodiment

The image generating apparatus 100 described in the first embodiment combines an image in a camera image to a glass region as illustrated in FIG. 5A or FIG. 5B without any modification and obtains a generated image. Accordingly, there are both a reflective component and a light-transmissive component in the generated image, which is untidy and difficult to view.

Figure 16:
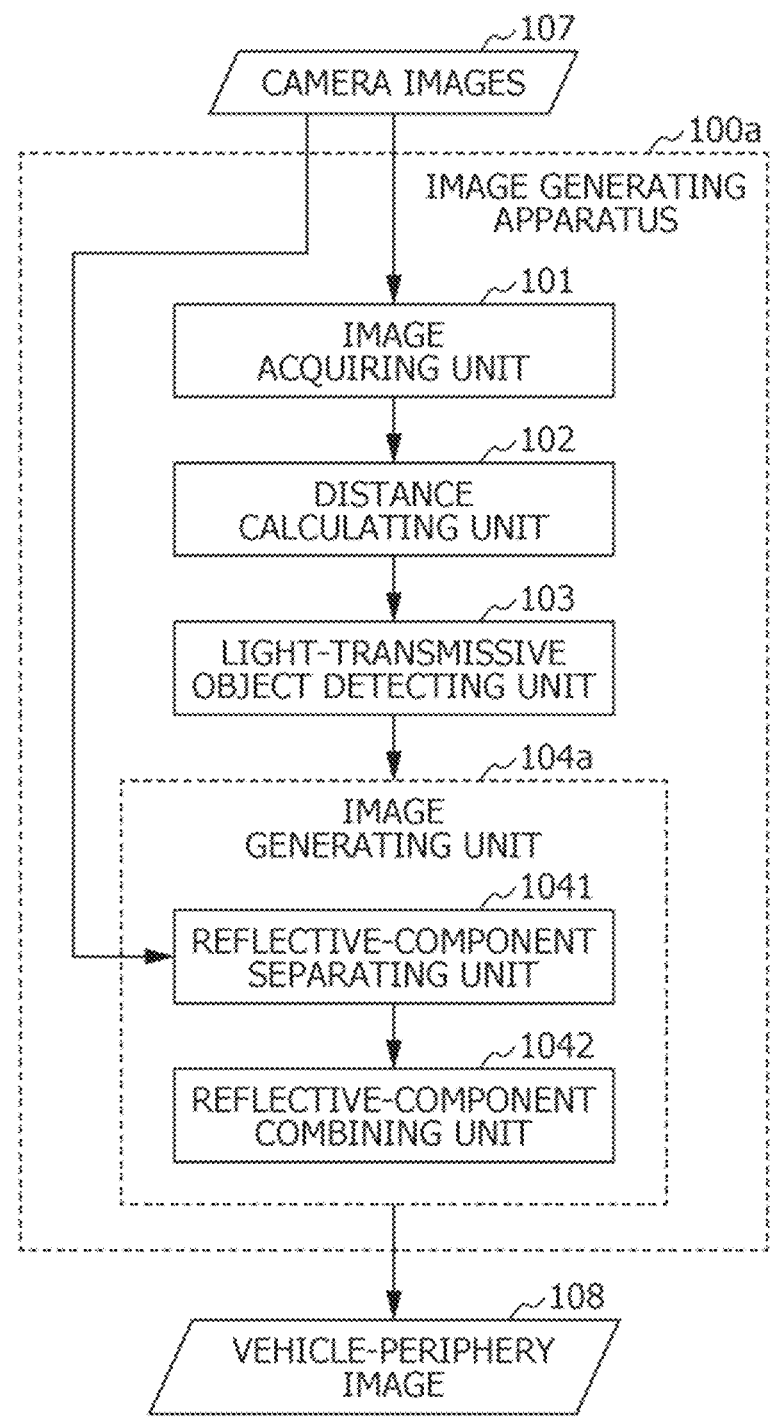
FIG. 16 is a block diagram illustrating an example of a functional configuration of an image generating apparatus according to a fourth embodiment.

Accordingly, as illustrated in FIG. 16, in an image generating apparatus 100a according to this embodiment, a reflective-component separating unit 1041 and a reflective-component combining unit 1042 are provided in an image generating unit 104a.

The reflective-component separating unit 1041 has a function of separating transmitted light and reflected light from each other in an image (in particular, on the surface of a light-transmissive object such as a glass surface), and, on the basis of the result of separation by the reflective-component separating unit 1041, the reflective-component combining unit 1042 combines an image after adjusting the ratio of the reflective component at the time of combination in a glass region on the basis of separately determined parameters when generating an image from a desired point of view. That is, the generated image is displayed by assigning weights to the light-transmissive component and the reflective component at a predetermined ratio at the position of the light-transmissive object in the generated image.

By combining an image in consideration of the reflective component in the generated image, it is effective in that the untidy appearance of the generated image can be improved.

Now, first, the operation of the reflective-component separating unit 1041 will be described below.

A large number of methods for separating a reflective component or a specular reflection component from an image have been proposed. The methods mainly include a method using light polarization characteristics and movement.

The method using light polarization characteristics is specifically described in S. K. Nayer, X. Fang, T. E. Boult, "Removal of Specularities Using Color and Polarization," Proceedings of Computer Vision and Pattern Recognition, pp. 583-590, 1993. It is known that, among pixel values acquired through a rotatory polarization plate, a brightness component that changes in accordance with the rotation direction of polarization corresponds to a specular reflection component, and in this method, the specular reflection component is separated by using this knowledge.

In particular, if a rotatory polarization plate is used for the above-described light-transmissive object detecting unit 103, this configuration can be directly used for the separation of a reflective component, and accordingly, the reflective component can be separated by using the same camera configuration.

On the other hand, the method using the movement is specifically described in T. Xue, M. Rubinstein, C. Liu, W. T. Freeman, "A Computational Approach for Obstruction-Free Photography," ACM Transactions on Graphics (Proc. SIGGRAPH) 34(4), 2015. In this method, when a moving camera captures an image including a reflective component, by using the fact that the movement of the reflective component largely differs from the movement of a light-transmissive component of an object that is transmitted through a glass surface in the image, the reflective component is separated.

Since the reflective component can be separated by using the camera configuration used for the distance calculating unit 102 without using a special camera, the reflective component can be separated with a simpler configuration.

The image generating unit 104a reconfigures an image in which the separated reflective component has been combined at a desired ratio, and on the basis of the reconfigured image, generates an image from a given point of view.

A driver often estimates the positional relationship between a glass surface and the subject vehicle from the reflective component in a glass region. In particular, if there is a glass surface in the heading direction, in accordance with the advancement of the subject vehicle, the mirror image of the subject vehicle seems approaching the subject vehicle quicker than a stationary object in the periphery. Accordingly, it is easy to recognize a reflective surface (glass surface) at the position where the mirror image is reflected. Therefore, if there is a large light-transmissive component with the reflective component in the glass region in the image captured by the camera unit 120, the driver may be prevented from recognizing the position of the glass surface on the basis of the reflective component.

To address this issue, when each reflective component is combined at a desired ratio to reconfigure an image, if the combination ratio of the light-transmissive component is decreased, the light-transmissive component as a cause of lowering the visibility of the mirror image of the subject vehicle can be suppressed. Thus, the driver can easily view the reflective component on the glass surface.

On the other hand, the reflective component of the subject vehicle may seem moving on the glass surface in a direction different from the direction of the movement of the subject vehicle. That is, a driver sees a component that moves in a manner quite different from the movement of the subject vehicle overlapped on the glass surface. Accordingly, depending on the driver, it may be difficult to estimate the position of the glass surface on the basis of the reflective component in some cases.

In such a case, if the ratio of the reflective component is increased, on the contrary, estimation of the position of the glass surface may be interrupted. Accordingly, when each reflective component is combined at the desired ratio to reconfigure an image, by decreasing the ratio of the reflective component, the reflective component of the subject vehicle can be reduced.

Thus, the driver can easily view the light-transmissive component. Since the light-transmissive component is dominant in the display, it is effective in that some drivers can easily estimate the position of the glass surface.

As described above, at which ratio (weights) between the reflective component and the light-transmissive component are to be combined so that the driver can easily recognize the position of the glass surface differs depending on the driver. Accordingly, the ratio of the reflective component at the time of combination may be set in advance for each driver.

In addition, during the daytime on a sunny day, since the falling sunlight is intense, specular reflection on a glass surface may cause glare to the driver. Since the reflective component is likely to be dominant, in this period of time or if the weather is like this, the ratio of the reflective component may be decreased compared with other periods of time or other weather.

In addition, during evening to nighttime, the brightness inside a space separated by a glass surface may largely differ from the brightness outside the space. If the inside space is bright, the light-transmissive component is dominant, and accordingly, the ratio of the light-transmissive component may be decreased compared with other periods of time.

In addition, in the case of a cloudy weather or during the nighttime, the headlamp and tail lamp of the vehicle are often lit. In this case, in the glass region in a captured image, the reflection of lamps is noticeable, and the light-transmissive component is more difficult to view. In such a case, the ratio of the reflective component may be largely decreased.

In addition, if the reflection of lamps is noticeable as in the above case, the detection of the glass region itself may fail. Specifically, such a case corresponds to a case where pixels more than or equal to a predetermined ratio are saturated in a camera image due to reflected light of lamps of the subject vehicle and/or another vehicle and/or a case where a histogram of a camera image includes a strong bias in a bright part and a dark part.

Accordingly, in such a case, an image from a point of view looking down from above is not generated, and instead, a message that prompts the driver to see the periphery of the vehicle, such as "There may be a glass surface. Please check by yourself.", may be displayed in a portion where the image from a point of view looking down from above has been displayed.

Fifth Embodiment

An image generating apparatus according to embodiments of the present disclosure aims to assist safe driving and to notify a driver of a glass surface that may pose a danger to the driver. Accordingly, it is not necessary to detect all glass surfaces in the periphery of the vehicle and to correct the distances to the glass surfaces. For example, for a glass surface that is unlikely to collide with the vehicle, one or more of a detection process, a distance estimation process, and a distance correction process may be skipped, and a generated image may be obtained by transforming the point of view by a method according to the related art. Thus, it is possible to obtain a generated image that is useful in assisting safe driving at a reduced calculation cost.

Figure 17:
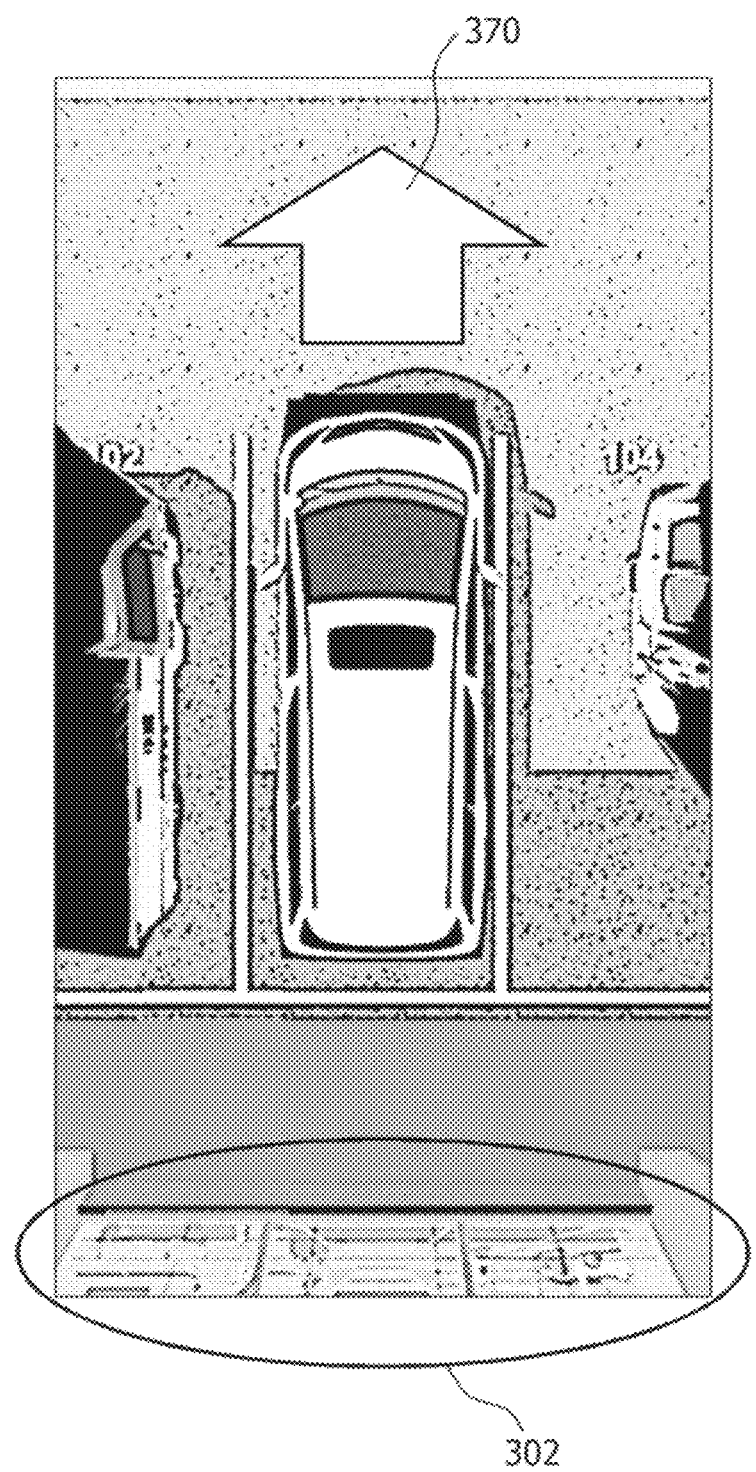
FIG. 17 illustrates the concept of an excluded region according to a fifth embodiment.

Specifically, as illustrated in FIG. 17, it is considered that it is unlikely to collide with a glass surface 302 on the opposite side of a vehicle heading direction 370. Accordingly, the light-transmissive object detecting unit 103 may detect the position of a light-transmissive object or a reflective object in a part excluding a part of the vehicle heading direction 370 in a camera image. Thus, it is possible to obtain a generated image that is useful in assisting safe driving at a reduced calculation cost.

FIG. 18 is a block diagram illustrating an example of a functional configuration of an image generating apparatus that performs a process for detecting a light-transmissive object by excluding, from the target of the process, a part of regions in a camera image. An image generating apparatus 100b illustrated in FIG. 18 includes an in-vehicle sensor information acquiring unit 105 and includes a light-transmissive object detecting unit 103b instead of the light-transmissive object detecting unit 103.

The in-vehicle sensor information acquiring unit 105 receives in-vehicle sensor information 109 from in-vehicle sensors in the subject vehicle, acquires gear information of the subject vehicle from the received in-vehicle sensor information 109, and transfers the gear information to the light-transmissive object detecting unit 103b. The in-vehicle sensor information 109 is read through a controller area network (CAN) bus (if CAN standard is employed) of an in-vehicle network. Note that the standard is not limited to CAN, and if another in-vehicle network standard such as FlexRay is employed, information may be read in accordance with the standard.

The gear information is a value assigned in accordance with the position of a shift lever of the vehicle. For example, if the gear is D (drive), N (neutral), R (reverse), and P (parking), different values of 1, 2, 3, and 4, respectively, are assigned as the gear information. It is needless to say that, since the relationship between the gear and the value differs depending on the vehicle and/or the sensors, the above case is merely an example, and the values are not limited to the above examples.

In accordance with the gear information, the light-transmissive object detecting unit 103b determines an area on which the process for detecting a light-transmissive object is to be performed, and then, as in the above-described light-transmissive object detecting unit 103, estimates the region of the light-transmissive object in the periphery of the vehicle and performs the process for detecting a light-transmissive object by correcting the distance to the region of the light-transmissive object.

Specifically, a vehicle in which a first camera that captures an image of a forward area of the vehicle and a second camera that captures an image of a backward area of the vehicle (e.g., the front camera unit 120a and the rear camera unit 120c illustrated in FIG. 12A) are installed will be considered.

Figure 19A:
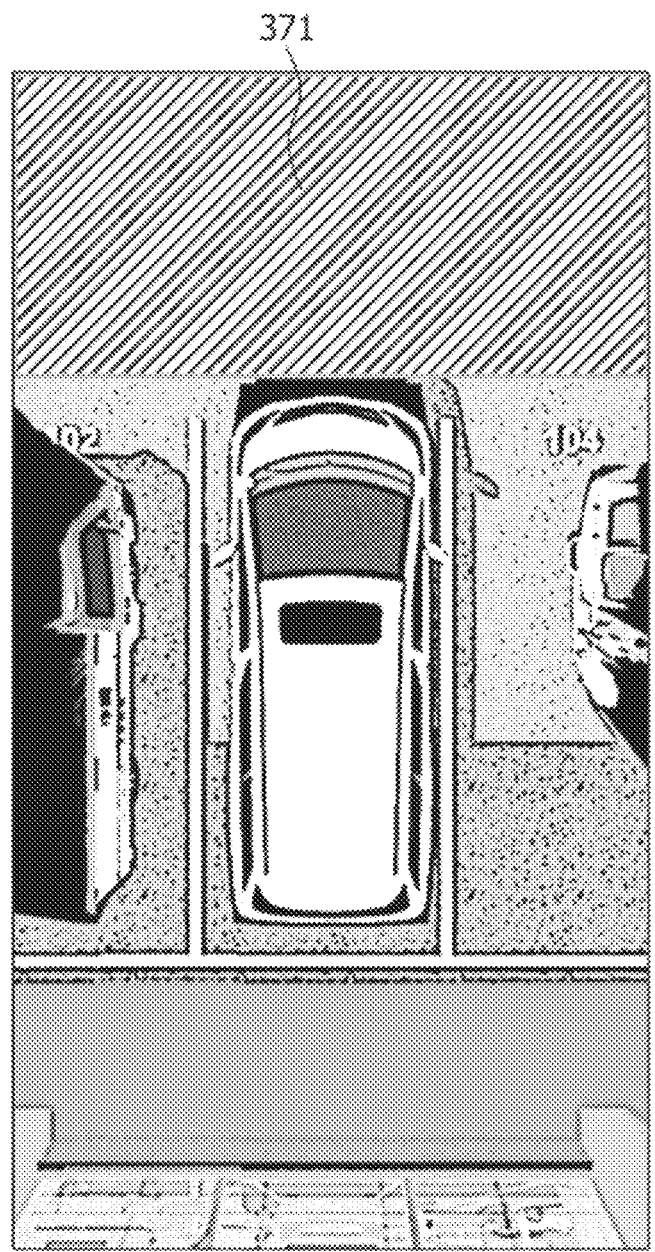
FIG. 19A illustrates an example of an excluded region according to the fifth embodiment.

If the gear information of the vehicle is a value corresponding to R (reverse), since the vehicle is advancing backward, it is considered that it is unlikely to collide with a glass surface in front of the subject vehicle. Accordingly, as illustrated in FIG. 19A, a region 371 in front of the subject vehicle in a camera image captured by the first camera (front camera) is excluded from the target of the process for detecting a light-transmissive object, and the position of the light-transmissive object or the reflective object is detected by using a camera image captured by the second camera (rear camera). Thus, the calculation cost can be reduced.

Figure 19B:
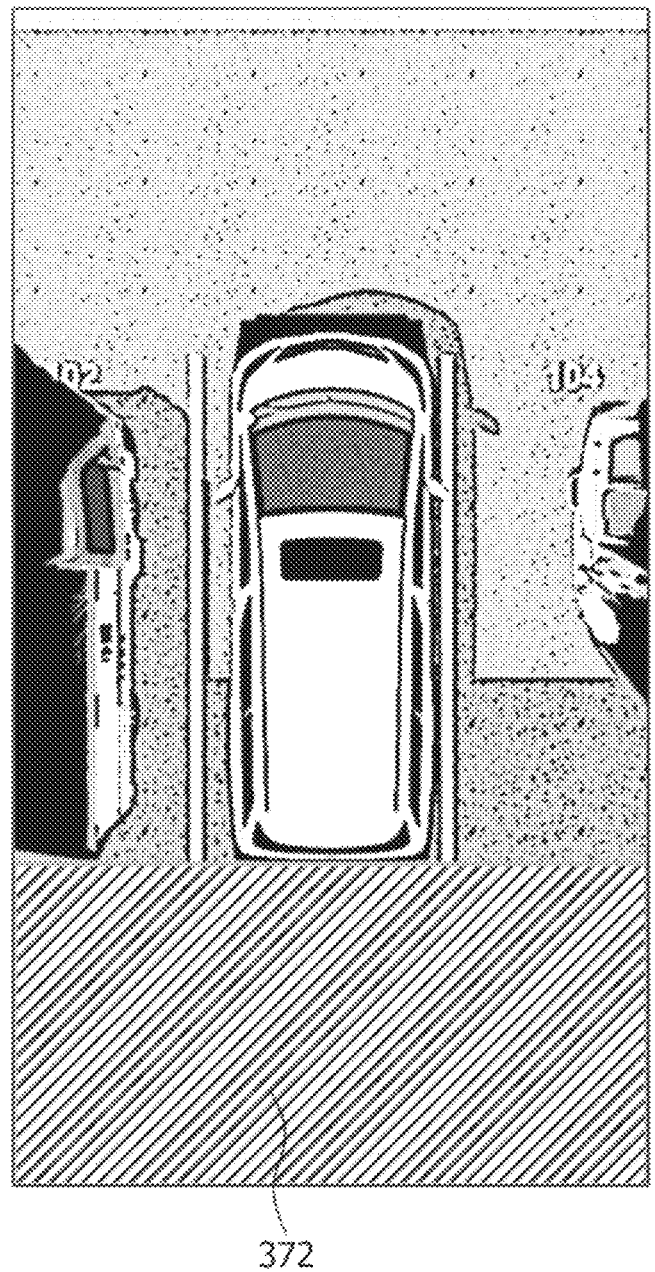
FIG. 19B illustrates an example of an excluded region according to the fifth embodiment.

Similarly, if the gear information is a value corresponding to D (drive), since the vehicle is advancing forward, it is considered that it is unlikely to collide with a glass surface behind the subject vehicle. Accordingly, as illustrated in FIG. 19B, a region 372 behind the subject vehicle in a camera image captured by the second camera (rear camera) is excluded from the target of the process for detecting a light-transmissive object, and the position of the light-transmissive object or the reflective object is detected by using a camera image captured by the first camera (front camera). Thus, the calculation cost can be reduced.

Note that the image generating apparatus that obtains a generated image that is useful in assisting safe driving at a reduced calculation cost is not limited to the above example.

For example, if the distance between a camera and the light-transmissive object or the reflective object estimated by the light-transmissive object detecting unit is larger than a predetermined threshold, it is possible not to correct the distance between the camera and a point in a space to be projected at the position of the light-transmissive object or the reflective object.

In addition, for example, if the lowest end of the light-transmissive object or the reflective object detected by the light-transmissive object detecting unit is higher than or equal to a predetermined threshold from the surface of a road, it is possible not to estimate the distance between the camera and the light-transmissive object or the reflective object and not to correct the distance between the camera and a point in a space to be projected at the position of the light-transmissive object or the reflective object.

Furthermore, for example, if the size of the light-transmissive object or the reflective object detected by the light-transmissive object detecting unit is smaller than a predetermined threshold, it is possible not to estimate the distance between the camera and the light-transmissive object or the reflective object and not to correct the distance between the camera and a point in a space to be projected at the position of the light-transmissive object or the reflective object.

In any of the above configurations, by skipping a process on a glass surface that is considered to be unlikely to collide with the subject vehicle, a generated image that is useful in assisting safe driving can be obtained at a reduced calculation cost.

A driver typically views the heading direction while driving. Thus, if a glass surface is present in a direction that is not the heading direction, the driver is more unlikely to notice the presence of the glass surface. Accordingly, in this case, a glass region in a generated image may be made noticeable by, for example, temporarily being made to blink.

In a case of autonomous driving, the above method can also be applied. It is known that the meaning of images to be presented to a driver is slightly different from assisting safe driving of the related art in the case of autonomous driving. That is, the images need to serve also as a user interface (UI) for notifying a driver that an autonomous driving vehicle correctly recognizes the ambient environment, thereby giving the driver a sense of security. In such a case, by combining an image captured by a camera to a glass region and by making the glass region noticeable by, for example, making a generated image to blink or superposing a color such as red or yellow, the driver can be notified that the autonomous driving vehicle recognizes the position of a glass surface.

Modifications

Note that an image generating apparatus according to a modification may include a display unit for displaying the generated vehicle-periphery image.

Figure 20:
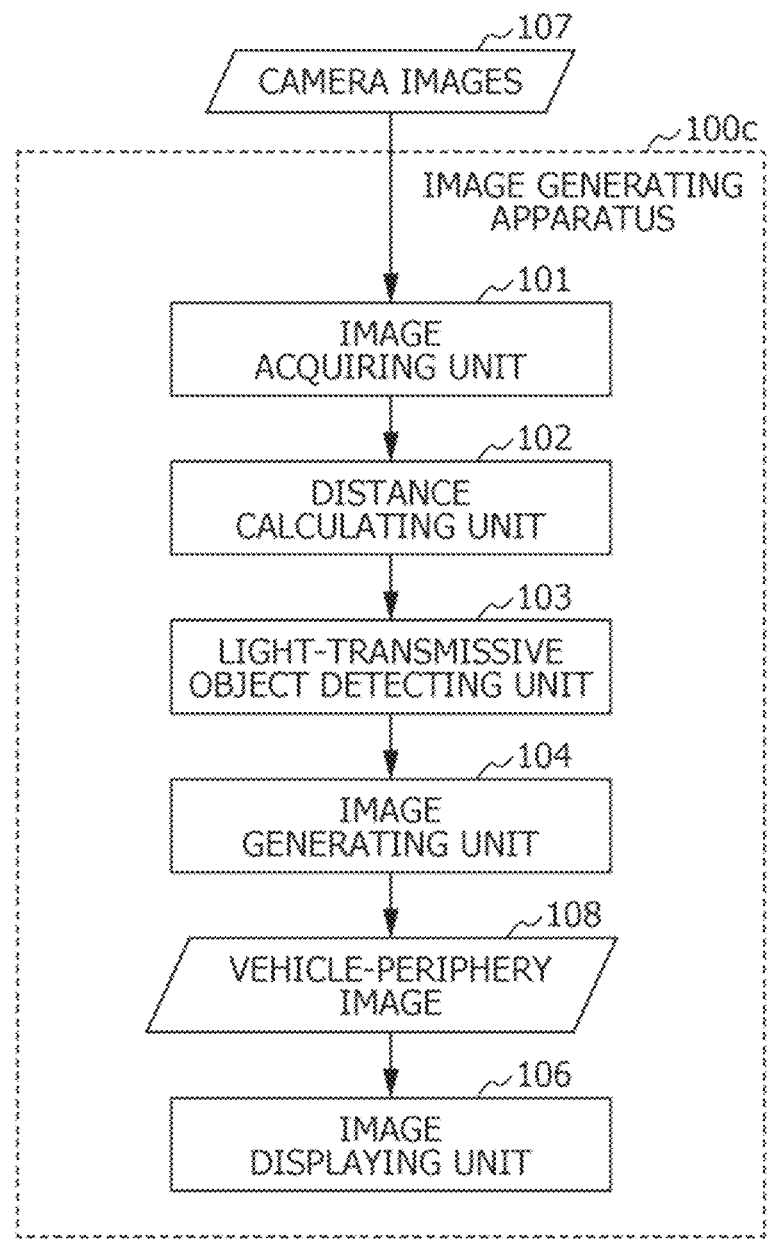
FIG. 20 is a block diagram illustrating an example of a functional configuration of an image generating apparatus according to a modification.

FIG. 20 is a block diagram illustrating an example of a functional configuration of the image generating apparatus according to the modification. An image generating apparatus 100c illustrated in FIG. 20 has a configuration obtained by adding a display unit 106 to the image generating apparatus 100 illustrated in FIG. 1. The display unit 106 includes a display circuit and may include, for example, the display 130 illustrated in FIG. 2.

The above various embodiments described in this specification can be combined with one another unless there are inconsistencies between the embodiments.

All or some of the units or devices, or all or some of the functional blocks of the block diagrams of the image generating apparatus illustrated in FIG. 1, the image generating apparatus illustrated in FIG. 16, and the image generating apparatus in FIG. 18 in the present disclosure may be implemented by one or one or more electronic circuits including a semiconductor device, a semiconductor integrated circuit (IC), or a large scale integration (LSI). The LSI or IC may be implemented by one chip or may be implemented by a combination of a plurality of chips. For example, functional blocks other than the storage element may be integrated on one chip. Although the term "LSI" or "IC" is used herein, the name changes depending on the degree of integration and the term "system LSI", "very large scale integration (VLSI)", or "ultra large scale integration (ULSI)" may be used. A field programmable gate array (FPGA) that is programmable after production of the LSI or a reconfigurable logic device in which connections within the LSI is reconfigurable and setup of circuit cells within the LSI are possible may be used for the same purpose.

Further, all or some of functions or operations of the units, the apparatuses, and part of the apparatuses can be implemented by software-based processing. In this case, the software is stored on one or one or more non-transitory recoding media, such as a ROM, an optical disc, or a hard disk drive. When the software is executed by a processing device (processor), the software causes the processing device (processor) and its peripheral devices to carry out a specific function included in the software. A system or an apparatus may include one or one or more non-transitory recording media storing the software, the processing device (processor), and necessary hardware devices, for example, an interface.

The apparatus according to the present disclosure may be a computer system including a microprocessor and a memory, the memory may store the foregoing computer program, and the microprocessor may execute the computer program.

The foregoing program or digital signals may be transferred by recording it on the recording medium, or the foregoing program or digital signals may be transferred through the network or the like, so as to execute or process the program or digital signals in another independent computer system.

In addition, each of the components of the embodiments may be implemented by dedicated hardware or by executing a software program suitable for the component. Each of the components may be implemented as a result of a program executor, such as a CPU or processor, reading and executing a software program stored on a recording medium, such as a hard disk or semiconductor memory.

An embodiment of the present disclosure is applicable to an image generating apparatus, such as an in-vehicle camera system, which generates an image including a light-transmissive object such as a glass surface or a reflective object so as to be easily recognizable by a user.

What is claimed is:

1. An apparatus comprising:
   a circuit,
   wherein the circuit
      acquires camera images generated by cameras,
      calculates a first distance between one of the cameras and a target by using the camera images, each of the camera images including the target,
      acquires infrared camera images captured by far-infrared cameras,
      calculates a second distance between one of the far-infrared cameras and the target by using the infrared camera images, each of the infrared camera images including the target, calculates a difference between the first distance and the second distance, and detects a position of a light-transmissive and/or light-reflective object on the basis of the difference.

2. The apparatus according to claim 1, wherein the circuit detects the position of the light-transmissive and/or light-reflective object on the basis of a comparison between the difference and a predetermined threshold.

3. The apparatus according to claim 1, wherein the first distance is a distance in a three-dimensional space, and the second distance is a distance in the three-dimensional space.

4. The apparatus according to claim 1, wherein a region corresponding to the light-transmissive and/or light-reflective object has a fixed area.

5. The apparatus according to claim 1, wherein the position of the light-transmissive and/or light-reflective object is detected using an image recognizing method using machine learning.

6. The apparatus according to claim 1, wherein the circuit generates an image from a point of view that is different from points of view of the camera images by using the first distance, the generated image including a predetermined image that is displayed in a region corresponding to the light-transmissive and/or light-reflective object.

7. A method comprising:

acquiring camera images generated by cameras;

calculating a first distance between one of the cameras and a target by using the camera images, each of the camera images including the target;

acquiring infrared camera images captured by far-infrared cameras;

calculating a second distance between one of the far-infrared cameras and the target by using the infrared camera images, each of the infrared camera images including the target;

calculating a difference between the first distance and the second distance; and detecting a position of a light-transmissive and/or light-reflective object on the basis of the difference.

* * * * *